United States Patent
Nagato et al.

(10) Patent No.: US 6,961,577 B2
(45) Date of Patent: Nov. 1, 2005

(54) RADIO COMMUNICATION SYSTEM FOR REDUCING INTERFERENCES WITH RESPECT TO OTHER COMMUNICATION SYSTEM USING CLOSE FREQUENCY BAND

(75) Inventors: Rie Nagato, Yokosuka (JP); Shinji Uebayashi, Yokohama (JP); Takayuki Ishiguro, Yokosuka (JP); Osamu Nakamura, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 459 days.

(21) Appl. No.: 10/153,899

(22) Filed: May 24, 2002

(65) Prior Publication Data

US 2002/0177444 A1 Nov. 28, 2002

(30) Foreign Application Priority Data

May 25, 2001 (JP) ........................................ 2001-157783
Aug. 22, 2001 (JP) ........................................ 2001-252021

(51) Int. Cl.[7] .................................................. H04Q 7/20
(52) U.S. Cl. .................................... 455/450; 455/452.1
(58) Field of Search ............................. 455/450, 452.1, 455/436, 446, 447, 451, 440, 422, 509

(56) References Cited

U.S. PATENT DOCUMENTS

| 5,448,751 A | | 9/1995 | Takenaka et al. |
| 5,666,654 A | * | 9/1997 | Kanai .......................... 455/512 |
| 5,737,704 A | * | 4/1998 | Jin et al. ...................... 455/450 |
| 6,078,815 A | * | 6/2000 | Edwards ....................... 455/450 |
| 6,493,539 B1 | * | 12/2002 | Falco et al. ............... 455/67.11 |

FOREIGN PATENT DOCUMENTS

| EP | 0 544 095 | 6/1993 |
| EP | 0 946 072 | 9/1999 |
| EP | 0 964 596 | 12/1999 |
| EP | 1 006 745 | 6/2000 |
| WO | WO 97/11571 | 3/1997 |
| WO | WO 99/59362 | 11/1999 |

* cited by examiner

*Primary Examiner*—Jean Gelin
(74) *Attorney, Agent, or Firm*—Oblon, Spivak, McClelland, Maier & Neustadt, P.C.

(57) ABSTRACT

A communication channel allocation method allocates a communication channel to communications between a mobile terminal device and a second radio base station using a second frequency band which is close to a first frequency band used by a first radio base station, by detecting a first distance between the second radio base station and the first radio base station, detecting a second distance between the second radio base station and the mobile terminal device when the first distance is less than a first threshold, and allocating a communication channel of a frequency far from the first frequency band in the second frequency band to the communications between the second radio base station and the mobile terminal device when the second distance is less than a second threshold.

8 Claims, 14 Drawing Sheets

RADIO COMMUNICATION SYSTEM FOR REDUCING INTERFERENCES WITH RESPECT TO OTHER COMMUNICATION SYSTEM USING CLOSE FREQUENCY BAND

BACKGROUND OF THE INVENTION

1. Field of the Invention

The present invention relates to a radio communication system for providing communication services to mobile terminal devices and a communication channel allocation method and a communication control device in that system.

2. Description of the Related Art

In the simplified portable telephone known as the so called PHS (Personal Handyphone System), the mobile terminal device has a smaller output (10 mW) compared with the current digital cellular phone system so that a range over which the mobile terminal device can carry out communications with the base station has been limited. Also, the scheme used in the existing PHS is capable of carrying out the data communications that are faster (32 KBPS to 64 KBPS, for example) compared with the current digital cellular phone system.

On the other hand, W-CDMA (Wideband-Code division Multiple Access) has been proposed as a scheme for realizing fast data communications (64 KBPS to 384 KBPS, for example).

This W-CDMA uses radio signals of 2G band (uplink: 1.92 to 1.98 GHz, downlink: 2.11 to 2.17 GHz), for example. Also, the PHS described above uses radio signals of 1.9 GHz band (12.89365 to 1.91945 GHz).

As such, these radio communication systems are using close frequencies so that, in order to avoid interferences between them, the so called guard band is provided between the frequency bands to be used by the respective radio communication systems. For example, the guard band of about 5 MHz is provided between the upper limit frequency of the frequency band to be used by the PHS and the lower limit frequency of the frequency band to be used by the W-CDMA.

Also, the devices to be used by the respective radio communication systems use a filter for reducing components outside a prescribed band (channel width), so as to avoid interferences between these radio communication systems.

However, depending on the positional relationships among the mobile terminal devices and the base stations of both the PHS and the W-CDMA or the like, there are cases where the components outside a prescribed band can be reduced sufficiently on one radio communication system but cannot be reduced sufficiently on another radio communication system.

In particular, the signal band of the W-CDMA is about 5 MHz, for example, so that the so called spurious components or noises are generated over a wide frequency region that may be extended beyond the guard band such that they can potentially cause interferences to the PHS side.

Also, the transmission power of the W-CDMA is considerably larger than the transmission power of the PHS so that there can also be cases where the so called receiver blocking occurs at the receiver of the PHS side to lower the reception sensitivity.

In order to avoid interferences with respect to the PHS, it is possible to consider the suppression of the generation of the spurious components or noises outside a prescribed band by improving the performance of filters on the W-CDMA side. However, a difference in the transmission power between the PHS and the W-CDMA is so large that an extremely severe blocking characteristic (the attenuation rate in the blocking region) would be required to the filters on the W-CDMA side if the components outside a prescribed band are to be suppressed to the level of not influencing the PHS side under any circumstances. The filter for realizing such a characteristic would have a complicated structure using many elements, which would require large power consumption and size. For this reason, the use of such a filter is difficult especially in the mobile terminal device for which demands for a smaller size and a lower power consumption are high.

It is also possible to consider the provision of providing a filter on the receiver of the PHS in order to prevent mixing of noises from the W-CDMA, but for the similar reason, this provision would make the device complicated and increase its cost.

BRIEF SUMMARY OF THE INVENTION

It is therefore an object of the present invention to provide a communication channel allocation method, a communication control device, and a radio communication system which are capable of contributing to the reduction of interferences with respect to the other communication system using radio signals of a close frequency band.

According to one aspect of the present invention there is provided a communication channel allocation method for allocating a communication channel to communications between a mobile terminal device and a second radio base station using a second frequency band which is close to a first frequency band used by a first radio base station, the communication channel allocation method comprising the steps of: detecting a first distance between the second radio base station and the first radio base station; detecting a second distance between the second radio base station and the mobile terminal device when the first distance is less than a first threshold; and allocating a communication channel of a frequency far from the first frequency band in the second frequency band to the communications between the second radio base station and the mobile terminal device when the second distance is less than a second threshold.

According to another aspect of the present invention there is provided a communication channel allocation method for allocating a communication channel to communications between a mobile terminal device and a second radio base station using a second frequency band which is close to a first frequency band used by a first radio base station, the communication channel allocation method comprising the steps of: detecting a distance between the first radio base station and the mobile terminal device; and allocating a communication channel of a frequency far from the first frequency band in the second frequency band to the communications between the second radio base station and the mobile terminal device when the distance is less than a prescribed threshold.

According to another aspect of the present invention there is provided a communication control device for controlling a communication channel to be used for communications between a mobile terminal device and a second radio base station using a second frequency band which is close to a first frequency band used by a first radio base station, the communication control device comprising: a first distance detection unit configured to detect a first distance between the second radio base station and the first radio base station; a second distance detection unit configured to detect a second distance between the second radio base station and the mobile terminal device when the first distance is less than a first threshold; and a channel allocation unit configured to allocate a communication channel of a frequency far from the first frequency band in the second frequency band to the communications between the second radio base station and the mobile terminal device when the second distance is less than a second threshold.

According to another aspect of the present invention there is provided a communication control device for controlling a communication channel to be used for communications between a mobile terminal device and a second radio base station using a second frequency band which is close to a first frequency band used by a first radio base station, the communication control device comprising: a distance detection unit configured to detect a distance between the first radio base station and the mobile terminal device; and a channel allocation unit configured to allocate a communication channel of a frequency far from the first frequency band in the second frequency band to the communications between the second radio base station and the mobile terminal device when the distance is less than a prescribed threshold.

According to another aspect of the present invention there is provided a communication channel allocation method for allocating a communication channel to communications between one mobile terminal device and a second radio base station using a second frequency band which is close to a first frequency band used by a first radio base station, the communication channel allocation method comprising the steps of: controlling a received power of signals from the one mobile terminal device at the second radio base station to be constant; obtaining allocation rates for channels to be used for communications between the second radio base station and the one mobile terminal device according to a total number of mobile terminal devices that are carrying out communications with the second radio base station and a total received power of signals other than signals from the one mobile terminal device; obtaining a channel switching distance to be a criterion for switching communication channels, according to the allocation rates; detecting a distance between the second radio base station and the one mobile terminal device; and allocating a communication channel of a frequency far from the first frequency band in the second frequency band to the communications between the second radio base station and the mobile terminal device when the distance is greater than the channel switching distance.

According to another aspect of the present invention there is provided a communication control device for controlling a communication channel to be used for communications between one mobile terminal device and a second radio base station using a second frequency band which is close to a first frequency band used by a first radio base station, the communication control device comprising: a received power control unit configured to control a received power of signals from the one mobile terminal device at the second radio base station to be constant; an allocation rate calculation unit configured to obtain allocation rates for channels to be used for communications between the second radio base station and the one mobile terminal device according to a total number of mobile terminal devices that are carrying out communications with the second radio base station and a total received power of signals other than signals from the one mobile terminal device; a distance calculation unit configured to obtain a channel switching distance to be a criterion for switching communication channels, according to the allocation rates; a distance detection unit configured to detect a distance between the second radio base station and the one mobile terminal device; and a channel allocation unit configured to allocate a communication channel of a frequency far from the first frequency band in the second frequency band to the communications between the second radio base station and the mobile terminal device when the distance is greater than the channel switching distance.

Other features and advantages of the present invention will become apparent from the following description taken in conjunction with the accompanying drawings.

DETAILED DESCRIPTION OF THE INVENTION

Referring now to FIG. 1 to FIG. 5, one embodiment of a radio communication system according to the present invention will be described in detail.

The present invention is applicable to the communication channel allocation, the communication control, etc., in a communication system operated under an environment in which another communication system using the close frequencies is existing, for example.

Figure 1:
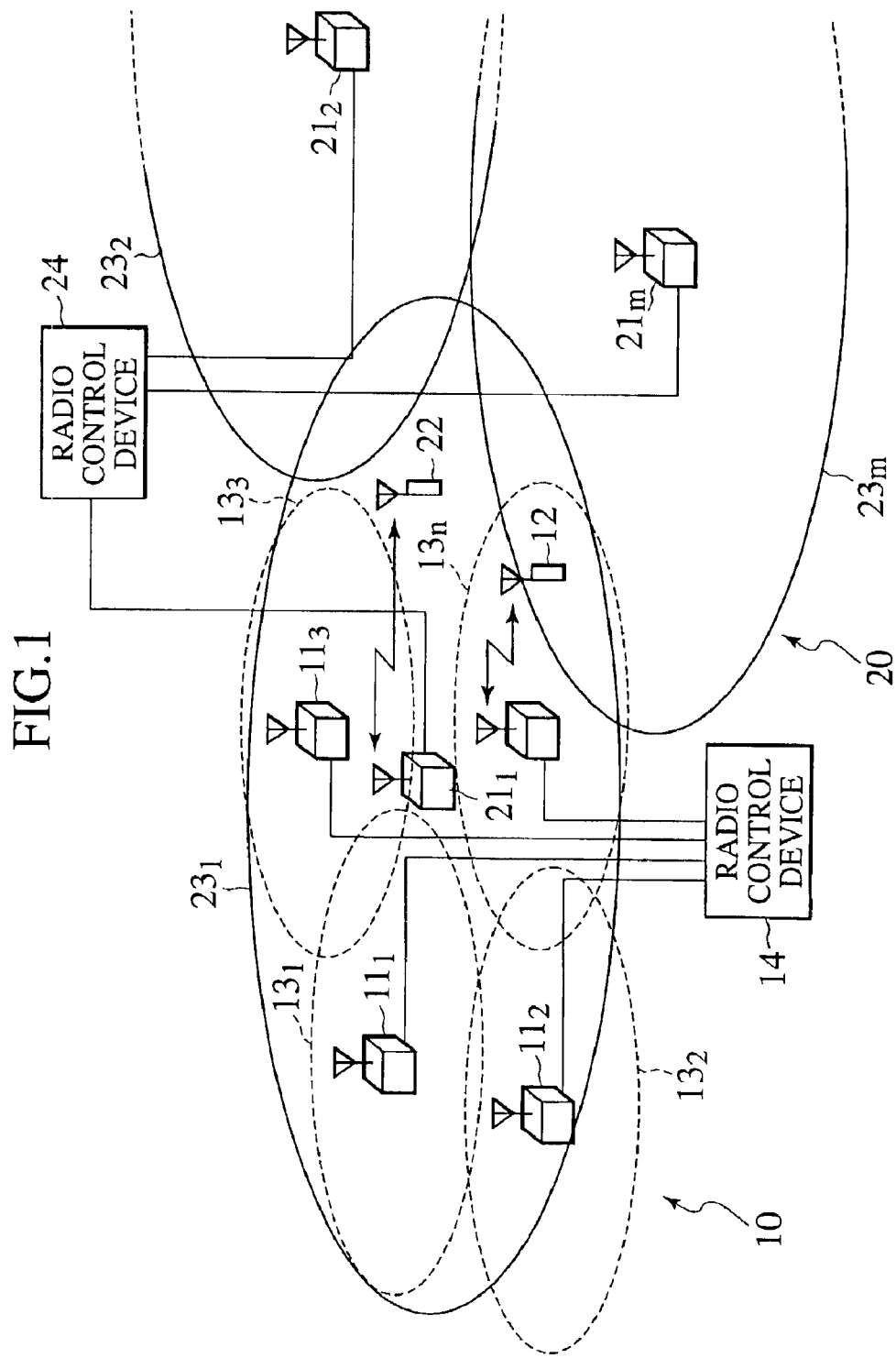
FIG. 1 is a diagram showing a configuration of a radio communication system according to the first embodiment of the present invention.

As shown in FIG. 1, for example, this radio communication system 20 provides communication services by using radio signals in a frequency band close to that of a radio communication system 10 having a plurality of base stations $11_1$ to $11_n$ for providing the communication services, for example, and a mobile terminal device 12 for utilizing the communication services provided by the base stations $11_1$ to $11_n$.

The radio communication system 10 is the PHS (Personal Handyphone System), for example, which uses radio signals of 1.9 GHz band (1.89365 to 1.91945 GHz), for example, for the communications between the base stations $11_1$ to $11_n$ and the mobile terminal device 12. Also, this radio communication system 10 uses the TDMA (Time Division Multiple Access) scheme in order to carry out communications between one base station and a plurality of mobile terminal devices. For channels for carrying out communications by such a TDMA scheme, a frequency band of 300 KHz is used per one channel, for example.

For the base stations $11_1$ to $11_n$, respective areas (cells) $13_1$ to $13_n$ are allocated. Also, each one of the base stations $11_1$ to $11_n$ is connected to a radio communication control unit 14 through a communication line.

Each one of the base stations $11_1$ to $11_n$ provides a connection service for the Internet, a wired communication network, another radio communication network, etc., for example, with respect to the mobile terminal device 12 within a corresponding one of the cells $13_1$ to $13_n$, through the radio communication control unit 14.

Also, the radio communication system 20 has a plurality of base stations $21_1$ to $21_m$ for providing the communication services, a mobile terminal device 22 for utilizing the communication services provided by the base stations $21_1$ to $21_m$, and a radio communication control unit 24 for carrying out a control of radio communications between the base stations $21_1$ to $21_m$ and the mobile terminal device 22.

The radio communication system 20 is a portable telephone system of the W-CDMA (Wideband-Code Division Multiple Access) scheme, for example, which uses radio signals of 2 GHz band (uplink: 1.92 to 1.98 GHz, downlink: 2.11 to 2.17 GHz), for example, for the communications between the base stations $21_1$ to $21_m$ and the mobile terminal device 22. Also, this radio communication system 20 uses the CDMA (Code Division Multiple Access) scheme in order to carry out communications using a plurality of channels, for which a frequency band of 5 MHz is used per one channel, for example. A plurality of such frequency bands are provided for each service provider of the radio communication system, for example.

Note that the transmission output of the mobile terminal device 12 of the radio communication system 10 is about 10 mW, for example, which is extremely small compared with the transmission output of the mobile terminal device 22 of the radio communication system 20.

For the base stations $21_1$ to $21_m$, respective areas (cells) $23_1$ to $23_m$ are allocated. Also, each one of the base stations $21_1$ to $21_m$ is connected to the radio communication control unit 24 through a wired or wireless communication line.

Each one of the base stations $21_1$ to $21_m$ provides a connection service for the Internet, a wired communication network, another radio communication network, etc., for example, with respect to the mobile terminal device 22 within a corresponding one of the cells $23_1$ to $23_m$, through the radio communication control unit 24.

At least a part of the cells $13_1$ to $13_n$ corresponding to the base stations $11_1$ to $11_n$ described above is overlapping with a cell $23_1$ corresponding to the base station $21_1$.

Also, in FIG. 1, one mobile terminal device 12 and one mobile terminal device 22 are shown for the sake of simplicity, but the number of the mobile terminal devices 12 and 22 are not limited and it is possible to use a plurality of mobile terminal devices 12 and/or a plurality of mobile terminal devices 22.

Figure 2:
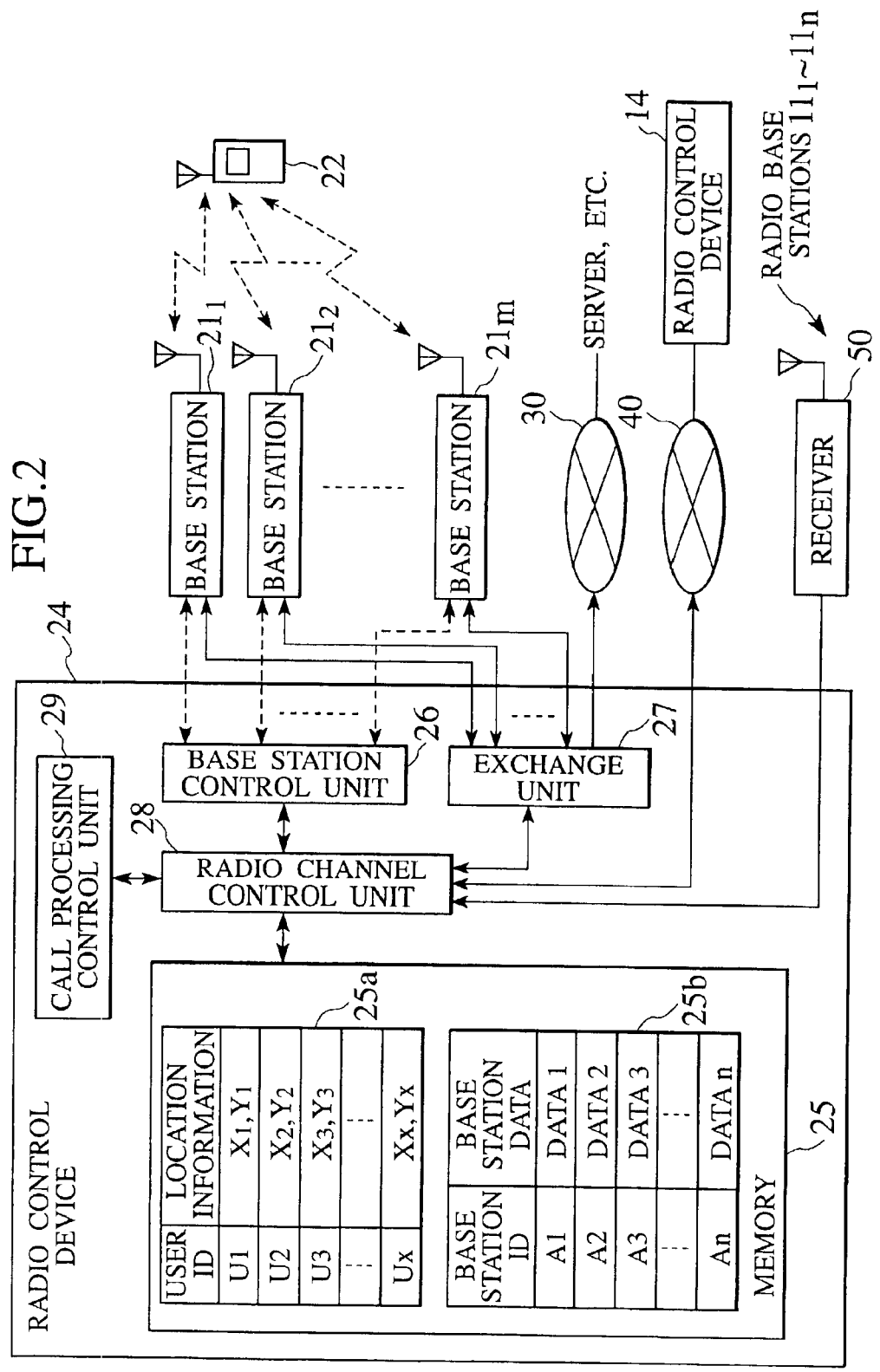
FIG. 2 is a block diagram showing a configuration of a radio control device in the radio communication system of FIG. 1.

The radio communication control unit 24 has a configuration shown in FIG. 2, for example, which has a memory 25 for storing information (location information) indicating a location of the mobile terminal device 22 of each user and information (base station data) such as locations of the base stations $11_1$ to $11_n$ of the radio communication system 10, a base station control unit 26 for controlling operations of the base stations $21_1$ to $21_m$, an exchange unit 27 for controlling communications between the base stations $21_1$ to $21_m$ and a network 30 or the like, a radio channel control unit 28 for controlling (uplink and downlink) communication channels to be used for communications between the base stations $21_1$ to $21_m$ and the mobile terminal device 22, and a call processing control unit 29 for carrying out a control of a call termination for the mobile terminal device 22 or a call originating from the mobile terminal device 22.

The memory 25 stores a terminal location table 25a for indicating locations of the mobile terminal devices 22 that are using the radio communication system 20, and a base station information table 25b for indicating information such as locations and communication channels in use of the base stations $11_1$ to $11_n$ of the radio communication system 10. Note that the memory 25 also stores a table for indicating locations of the base stations $21_1$ to $21_m$ and correspondences to the base stations $11_1$ to $11_n$ that have the cells $13_1$ to $13_n$ overlapping with the cells $23_1$ to $23_m$, for each one of the base stations $21_1$ to $21_m$.

The location information of each mobile terminal device 22 stored in the terminal location table 25a is information indicating a location of that mobile terminal device 22 that is supplied from that mobile terminal device 22, for example. The mobile terminal device 22 obtains its own location according to strengths of radio signals from a plurality of base stations $21_1$ to $21_m$ and locations of these base stations $21_1$ to $21_m$, and supplies it to the radio communication control unit 24 along with an identification information (user ID) assigned to that mobile terminal device 22. The radio communication control unit 24 stores the supplied identification information and location information into the terminal location table 25a through the base station control unit 26 and the radio channel control unit 28.

Alternatively, it is also possible to provide a location detection unit such as the so called GPS (Global Positioning System) to the mobile terminal device 22 and supplies the location of the mobile terminal device 22 detected by this location detection unit to the radio communication control unit 24 similarly as described above. The information indicating the location from the mobile terminal device 22 is supplied to the radio communication control unit 24 at a prescribed time interval, for example, such that the location of the mobile terminal device 22 stored in the terminal location table 25a is regularly updated accordingly.

The radio channel control unit 28 is connected with the radio communication control unit 14 of the radio communication system 10 through a network 40, for example. Also, the this radio channel control unit 28 is connected with a receiver 50 for receiving radio signals from the base stations $11_1$ to $11_n$ that constitute the radio communication system 10. This receiver 50 detects a cell ID, a location, etc., of each one of the base stations $11_1$ to $11_n$ according to the radio signals received from each one of the base stations $11_1$ to $11_n$, and supplies them to the radio channel control unit 28. The radio channel control unit 28 stores the supplied cell ID, location, etc., into the base station information table 25b described above as the base station data.

Note that, in order to detect the locations of the base stations $11_1$ to $11_n$, the receiver 50 may detect only the cell IDs of the base stations $11_1$ to $11_n$ and the radio channel control unit 28 may acquire the information indicating the locations and the like of the base stations $11_1$ to $11_n$ corresponding to these cell IDs from the radio communication control unit 14 or the like via the network 40. It is also possible for the radio channel control unit 28 to simply acquire the information indicating the locations and the like of the base stations $11_1$ to $11_n$ from the radio communication control unit 14 instead.

Figure 3:
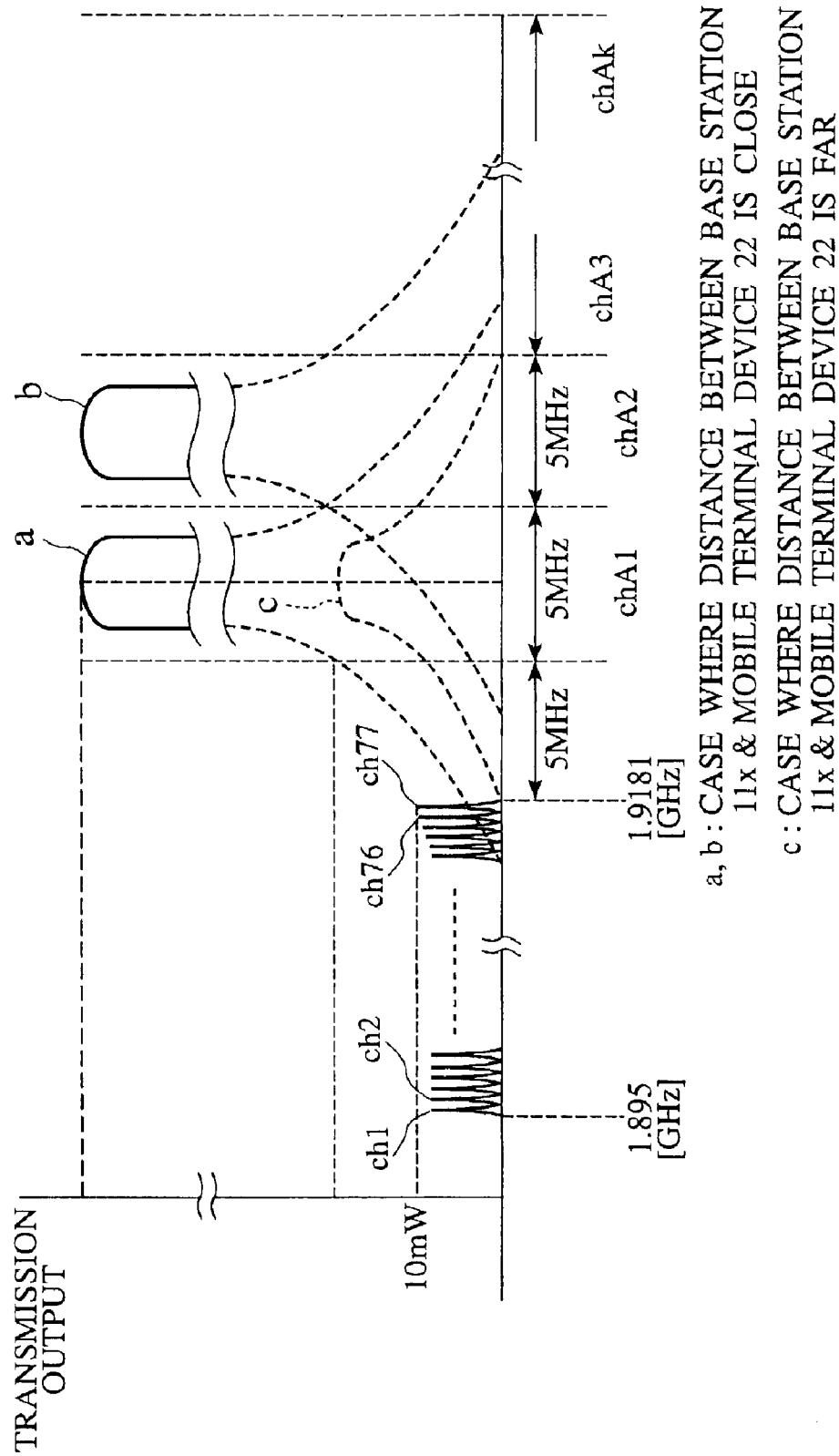
FIG. 3 is a diagram showing exemplary communication channels to be used in the radio communication system of FIG. 1.

Now, as shown in FIG. 3, for example, the frequency band to be used for the downlink (transmission from the base station to the mobile terminal device) in the radio communication system 20 is separated from the frequency band to be used by the PHS but the lower limit frequency of the frequency band to be used for the uplink (transmission from the mobile terminal device to the base station) is close to the upper limit frequency of the frequency band to be used by the PHS. Note that FIG. 3 compares the transmission powers of the mobile terminal device 12 and the mobile terminal device 22, which are different from the signal strengths from the mobile terminal devices 12 and 22 at the base stations $11_1$ to $11_n$.

As shown in FIG. 3, the radio communication system 10 is made to be capable of appropriately selecting one of communication channels in the frequency band of the 1.9 GHz band described above, for example, and using it for communications between the base stations $11_1$ to $11_n$ and the mobile terminal device 12. Also, the radio communication system 20 is made to be capable of appropriately selecting a communication channel among k channels (chA1, chA2, chA3, . . . , chAk-1, chAk) with each having 5 MHz bandwidth, and using it for communications between the base stations $21_1$ to $21_m$ and the mobile terminal device 22.

Also, as shown in FIG. 3, a frequency band (guard band) that is not to be used by either radio communication system is provided between the frequency band to be used by the radio communication system 10 and the frequency band to be used by the radio communication system 20. This guard band has a bandwidth of 5 MHz, for example.

Also, as described above, the transmission output of the mobile terminal device 12 of the radio communication system 10 is extremely small compared with the transmission output of the mobile terminal device 22 of the radio communication system 20, so that there are cases where the large noises are caused to the radio communication system 10 side even when the components outside the prescribed frequency band are attenuated to a sufficient level at the radio communication system 20 side.

Also, because the transmission power of the mobile terminal device 22 is extremely larger than the transmission power of the mobile terminal device 12, there are cases where the so called receiver blocking occurs at the receiver of the base stations $11_1$ to $11_n$ to lower the reference sensitivity, depending on conditions.

For this reason, this radio communication system 20 is made to control the communication channel to be used for the uplink from the mobile terminal device 22 to the base station 21 in order to reduce the influence that can be given to the radio communication system 10 side.

The strength (power) of the components outside the frequency band from the mobile terminal device 22 that are observed as noises at the base stations $11_1$ to $11_n$ will vary according to a distance between the mobile terminal device 22 and each of the base stations $11_1$ to $11_n$ and a difference in frequency between the communication channel used by the mobile terminal device 22 and the communication channel used by each of the base stations $11_1$ to $11_n$.

More specifically, when the distance between the mobile terminal device 22 and each of the base stations $11_1$ to $11_n$ becomes large, the strength of the components outside the frequency band from the mobile terminal device 22 is lowered due to the spatial propagation loss. Also, when the difference in frequency between the communication channel used by the mobile terminal device 22 and the communication channel used by each of the base stations $11_1$ to $11_n$ becomes large, the strength of the components outside the frequency band that are observed as noises at the base stations $11_1$ to $11_n$ is lowered. This is due to the fact that the strength of the spurious components such as higher harmonic components, the intermodulation components, etc., that are caused by the non-linearity of the amplifier of the radio communication device or the like becomes lower as they are more separated from the carrier frequency.

For this reason, the radio channel control unit 28 is made to be capable of obtaining a distance between the mobile terminal device 22 and each of the base stations $11_1$ to $11_n$ and a difference in frequency between the communication channel used by each of the base stations $11_1$ to $11_n$ and the communication channel used for the uplink from the mobile terminal device 22, according to the terminal location table 25a and the base station information table 25b stored in the memory 25 described above and the frequency of the communication channel for the uplink from the mobile terminal device 22 that is managed separately. In addition, the radio channel control unit 28 judges whether the detected distance and frequency difference are at such a level to cause interferences or not, and executes the processing for allocating the communication channel to be used for the uplink from the mobile terminal device 22 according to this judgement result.

Now, when the base stations $11_1$ to $11_n$ are located within a prescribed distance from the base station $21_x$, there can be cases where it suffices to judge whether interferences are caused or not by using distances to the mobile terminal devices 22 that are obtained by approximation for assuming that the base stations $11_1$ to $11_n$ are located at the location of that base station $21_x$.

Also, as for the difference in frequency between the communication channel used by each of the base stations $11_1$ to $11_n$ and the communication channel used for the uplink from the mobile terminal device 22, because the channel width of the communication channel of the radio communication system 20 is extremely larger than the channel width of the communication channel of the radio communication system 10, there can be cases where it suffices to judge whether interferences are caused or not by accounting only the communication channel used for the uplink from the mobile terminal device 22, without accounting for the communication channel used by each of the base stations $11_1$ to $11_n$.

By simplifying parameters for judging whether interferences are caused or not in this way, it is possible to reduce the load of the communication channel allocation processing at the radio communication control unit 24.

Figure 4:
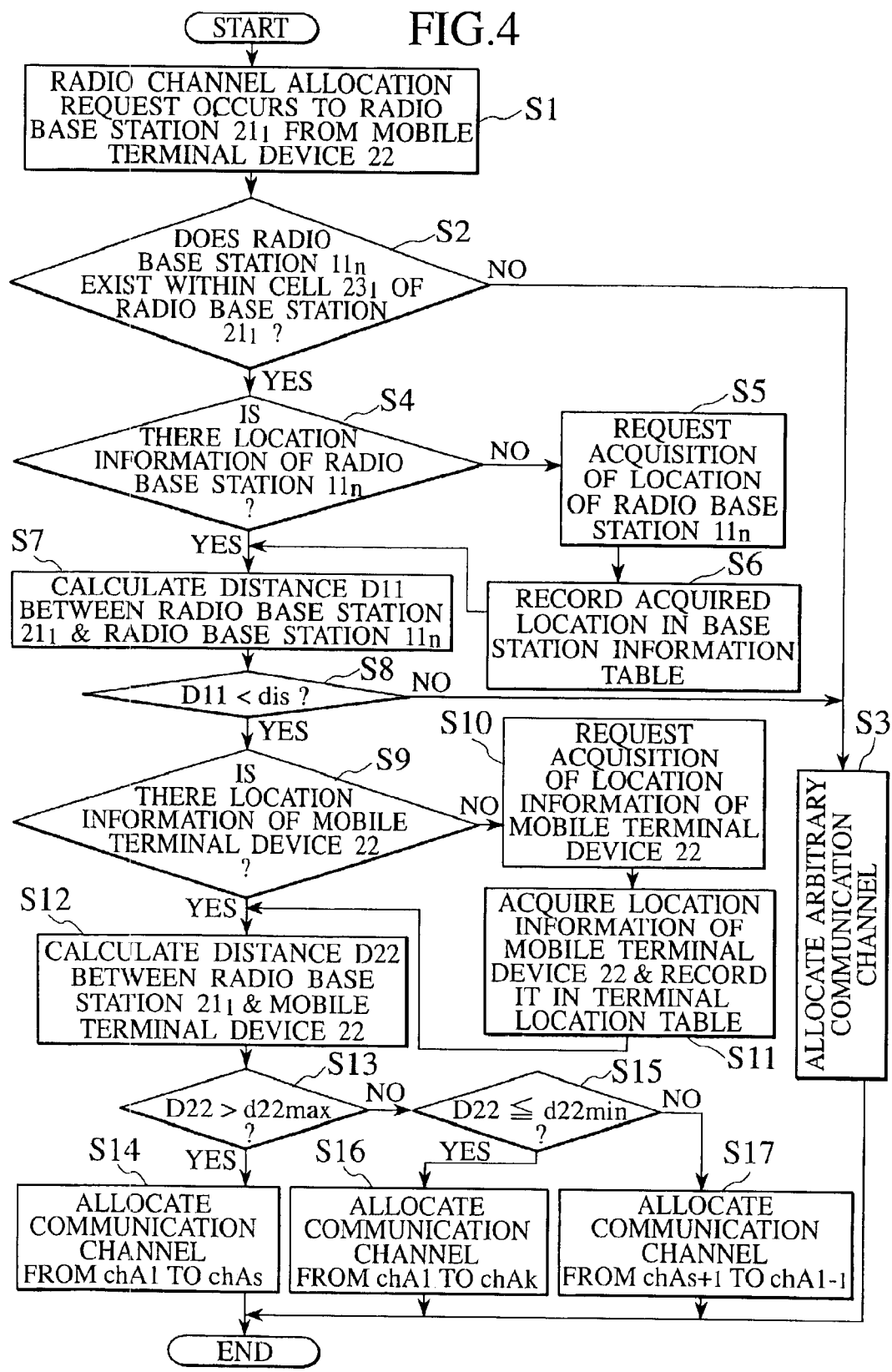
FIG. 4 is a flow chart for one exemplary communication channel allocation processing in the radio communication system of FIG. 1.

In this communication channel allocation processing, as shown in FIG. 4, for example, when a call from the mobile terminal device 22 with respect to the base station $21_1$ occurs at the step S1, the radio channel control unit 28 checks whether any of the base stations $11_1$ to $11_n$ of the radio communication system 10 exists within the cell $23_1$ of that base station $21_1$ or not, by referring to the base station information table 25b in the memory 25 (step S2). When none of the base stations $11_1$ to $11_n$ exists within that cell $23_1$, the processing proceeds to the step S3, where an arbitrary communication channel among the above described channels (chA1, chA2, . . . ) is allocated as a frequency of the uplink from the mobile terminal device 22, and the communication channel allocation processing is finished.

On the other hand, when any of the base stations $11_1$ to $11_n$ of the radio communication system 10 exists within the cell $23_1$ of that base station $21_1$, the processing proceeds to the step S4, where whether the information indicating locations of the corresponding base stations $11_1$ to $11_n$ is recorded in the base station information table 25b or not is checked. When the information indicating locations of these base stations $11_1$ to $11_n$ is recorded in the base station information table 25b, the processing proceeds to the step S7.

When the information indicating locations of the corresponding base stations $11_1$ to $11_n$ is not recorded in the base station information table 25b, the radio channel control unit 28 acquires the information indicating locations of the corresponding base stations $11_1$ to $11_n$ from the radio communication control unit 14 via the network 40, for example (step S5) and stores it into the base station information table 25b (step S6), and the processing proceeds to the step S7.

Note that, instead of acquiring the information indicating locations of the corresponding base stations $11_1$ to $11_n$ from the radio communication control unit 14 via the network 40 at the step S5, the locations of the base stations $11_1$ to $11_n$ may be acquired according to the cell IDs or the like in the signals received from the base stations $11_1$ to $11_n$ by the receiver 50, for example. Also, the processing of these steps S4 to S6 is executed for each one of the base stations $11_1$ to $11_n$ within the cell $23_1$. In this way, a state in which the information indicating locations of all of the base stations $11_1$ to $11_n$ within the cell $23_1$ is stored in the base station information table 25b is realized before the step S7 is executed.

At the step S7, the radio channel control unit 28 obtains a distance (D11) between the base station $21_1$ and each one of the base stations $11_1$ to $11_n$ within the cell $23_1$ from the locations of the base stations $11_1$ to $11_n$ in the base station information table 25b and the separately stored information indicating the location of the base station $21_1$. Next, at the step S8, the radio channel control unit 28 compares the distance (D11) between the base station $21_1$ and each one of the base stations $11_1$ to $11_n$ within the cell $23_1$ with a prescribed distance (dis). When all of the distances (D11) between the base station $21_1$ and the base stations $11_1$ to $11_n$ within the cell $23_1$ are greater than or equal to the prescribed distance (dis), the processing proceeds to the step S3, where an arbitrary communication channel is allocated to the uplink from the mobile terminal device 22, and the communication channel allocation processing is finished.

On the other hand, when the distance (d11) between the base station $21_1$ and any one of the base stations $11_1$ to $11_n$ within the cell $23_1$ is less than the prescribed distance (dis), the processing proceeds to the step S9, where the radio channel control unit 28 checks whether the location information of the mobile terminal device 22 is stored in the terminal location table 25a or not. When the location information of the mobile terminal device 22 is stored in the terminal location table 25a, the processing proceeds to the step S12, whereas otherwise the processing proceeds to the step S10.

In the latter case, the radio channel control unit 28 acquires the location of the mobile terminal device 22 (step S10) and stores it into the terminal location table 25a (step S11), and the processing proceeds to the step S12.

At the step S12, the radio channel control unit 28 calculates a distance (D22) between the base station $21_1$ and the mobile terminal device 22.

After that, the radio channel control unit 28 selects a communication channel to be allocated to the uplink from the mobile terminal device 22 at the step S13 and subsequent steps.

Here, it is assumed that $1 \leq s \leq 1 \leq k$ and $d22min \leq d22max$, where s and l are arbitrary integers, which are numbers to be set up in order to make the channel set up easier by dividing the channels that can be used by the radio communication system 20 into three regions. Also, d22max is a distance between the base station $21_1$ and the mobile terminal device 22 under the condition of not causing interferences to those base stations $11_1$ to $11_n$ for which the distance (D11) from the base station $21_1$ is less than the prescribed distance (dis) even when the communication channel closest to the frequency band to be used by the radio communication system 10 (chA1 in FIG. 3 described above) is used as the communication channel for the uplink from the mobile terminal device 22, and this d22max is obtained by experiments, for example.

First, at the step S13, the radio channel control unit 28 judges whether the distance (D22) between the base station $21_1$ and the mobile terminal device 22 obtained at the step S12 is greater than a prescribed threshold (d22max) or not.

When the distance (D22) between the base station $21_1$ and the mobile terminal device 22 is greater than the prescribed threshold (d22max), it is possible to consider that those base stations $11_1$ to $11_n$ for which the distance (D11) from the base station $21_1$ is less than the prescribed distance (dis) will not be receiving interferences by the communication channel for the uplink from the mobile terminal device 22. For this reason, the radio channel control unit 28 allocates available channel among the communication channels (chAl to chAs) close to the frequency band to be used by the radio communication system 10 as the communication channel for the uplink from the mobile terminal device 22 through the base station control unit 26 at the step S14, and the communication channel allocation processing is finished. The allocated communication channel is notified to the base station control unit 26 and the transmission for the uplink from the mobile terminal device 22 is started.

On the other hand, when the distance (D22) between the base station $21_1$ and the mobile terminal device 22 is less than or equal to the prescribed threshold (d22max), the radio channel control unit 28 judges whether the distance (D22) between the base station $21_1$ and the mobile terminal device 22 obtained at the step S12 is less than or equal to a prescribed threshold (d22min) or not.

When the distance (D22) between the base station $21_1$ and the mobile terminal device 22 is less than or equal to the prescribed threshold (d22min), if the communication channel close to the frequency band to be used by the radio communication system 10 is allocated as the communication channel for the uplink from the mobile terminal device 22, it is possible to consider that those base stations $11_1$ to $11_n$ for which the distance (D11) from the base station $21_1$ is less than the prescribed distance (dis) will be receiving interferences. For this reason, the radio channel control unit 28 allocates available channel among the communication channels (chAl to chAk) far from the frequency band to be used by the radio communication system 10 as the communication channel for the uplink from the mobile terminal device 22 through the base station control unit 26 at the step S16, and the communication channel allocation processing is finished. The allocated communication channel is notified to the base station control unit 26 and the transmission for the uplink from the mobile terminal device 22 is started.

On the other hand, when both of the conditions of the step S13 and the step S15 described above are not satisfied, i.e., when the distance (D22) between the base station $21_1$ and the mobile terminal device 22 is greater than d22min and less than or equal to d22max, the processing proceeds to the step S17 where the radio channel control unit 28 allocates available channel among the communication channels (chAs+1 to chAl−1) other than those that can be allocated by the step S14 and the step S16 described above as the communication channel for the uplink from the mobile terminal device 22 through the base station control unit 26, and the communication channel allocation processing is finished. The allocated communication channel is notified to the base station control unit 26 and the transmission for the uplink from the mobile terminal device 22 is started.

Note that when the above described d22max and d22min are equal, the above described s and l are set to be s=l so as to divide the communication channels that can be used for the uplink from the mobile terminal device 22 into two. In this case, either one of the conditions of the step S13 and the step S15 described above is always satisfied, so that the processing of the step S17 will not be executed.

Also, the communication channel allocation processing from the step Sl to the step S17 of FIG. 4 described above will be executed for each mobile terminal device 22 separately. In this way, the appropriate communication channels for the uplink can be set up even when a plurality of mobile terminal devices 22 exist.

As described above, in this radio communication system 20, when the base stations $11_1$ to $11_n$ exist within a prescribed distance (D11) from the base station $21_1$, if the distance between the base station $21_1$ and the mobile terminal device 22 is less than or equal to a prescribed distance (d22min), the communication channel far from the frequency band that can be used by the radio communication system 10 is allocated as the communication channel for the uplink from the mobile terminal device 22.

Consequently, in this radio communication system 20, the reduction of the interferences caused to the base stations $11_1$ to $11_n$ of the radio communication system 10 can be realized easily.

Also, in this radio communication system 20, there is no need to required an unnecessarily severe characteristic to the filter for suppressing the components outside the prescribed frequency band, so that there is no need to make the configuration of the mobile terminal device 22 or the base stations $11_1$ to $11_n$ unnecessarily complicated. For this reason, it is possible to contribute to the reduction of the size and the power consumption of these devices. It is also possible to prevent an unnecessary increase of the cost.

Note that the above description is directed to the processing for allocating the communication channel to be used for the uplink from one mobile terminal device 22 to one of the base stations $21_1$ to $21_m$, but there can also be cases for transmitting the uplinks from one mobile terminal device 22 to a plurality of the base stations $21_1$ to $21_m$. In such a case, the communication channel allocation processing from the step S1 to the step S17 of FIG. 4 described above will be executed for each uplink.

Note also that the above description is directed to the case of controlling the allocation of the communication channel to be used for the uplink from the mobile terminal device 22 according to the distance between the base station $21_1$ and the mobile terminal device 22 when the base stations $11_1$ to $11_n$ exist within a prescribed distance (dis) from the base station $21_1$. By processing according to the distance between the base station $21_1$ and the mobile terminal device 22 in this way, the processing load becomes smaller compared with the case of obtaining the distance between each one of the base stations $11_1$ to $11_n$ and the mobile terminal device 22.

However, from a viewpoint of improving the spatial utilization efficiency of radio signals, there can be cases where it is preferable to obtain the distance between each one of the base stations $11_1$ to $11_n$ and the mobile terminal device 22 and control the allocation of the communication channel to be used for the uplink from the mobile terminal device 22 according to these distances.

Figure 5:
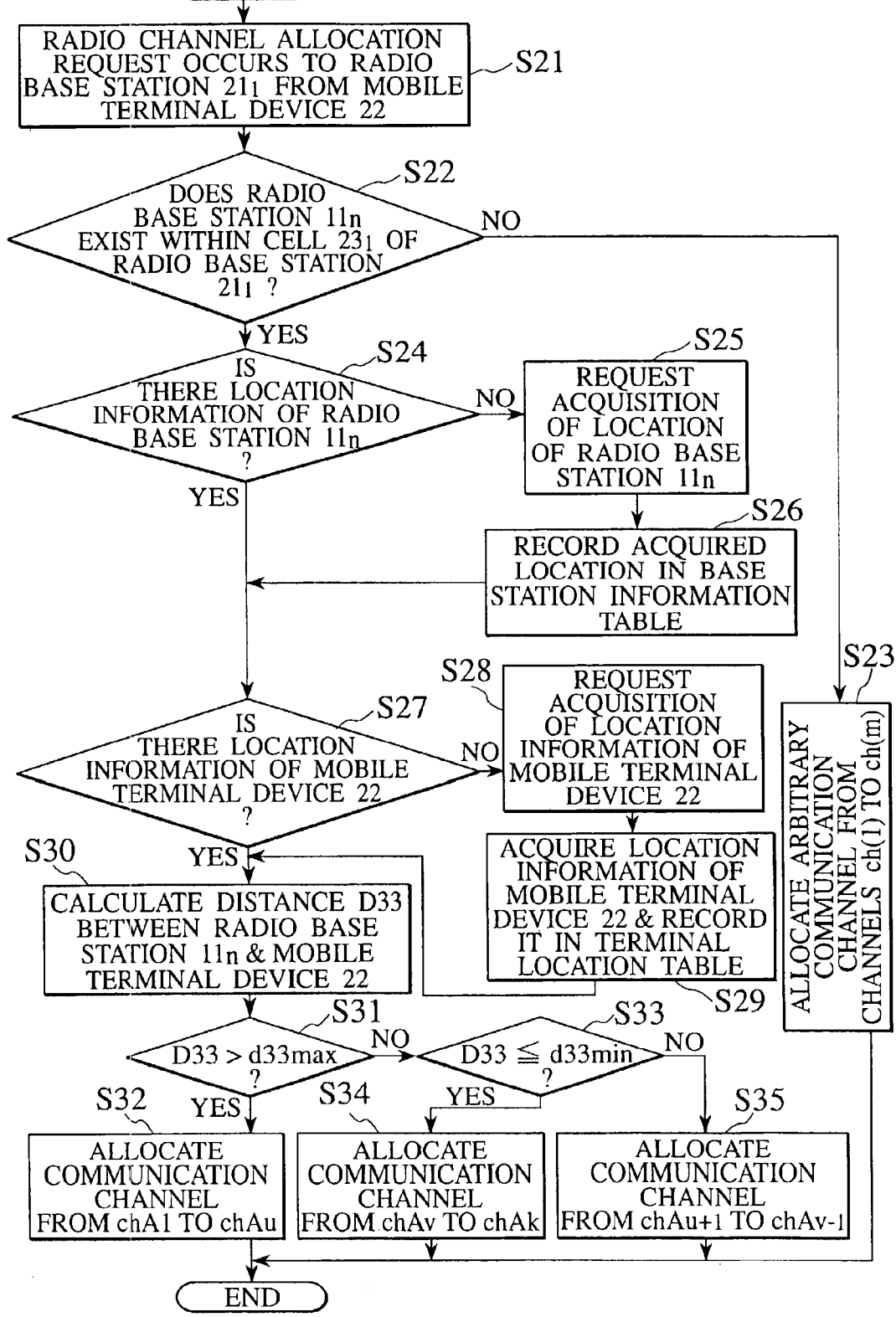
FIG. 5 is a flow chart for another exemplary communication channel allocation processing in the radio communication system of FIG. 1.

In this communication channel allocation processing, as shown in FIG. 5, for example, when a call from the mobile terminal device 22 with respect to the base station $21_1$ occurs at the step S21, the radio channel control unit 28 checks whether any of the base stations $11_1$ to $11_n$ of the radio communication system 10 exists within the cell $23_1$ of that base station $21_1$ or not, by referring to the base station information table 25b in the memory 25 (step S22). When none of the base stations $11_1$ to $11_n$ exists within that cell $23_1$, the processing proceeds to the step S23, where an arbitrary communication channel among the above described channels (chA1, chA2, . . . ) is allocated as a frequency of the uplink from the mobile terminal device 22, and the communication channel allocation processing is finished.

On the other hand, when any of the base stations $11_1$ to $11_n$ of the radio communication system 10 exists within the cell $23_1$ of that base station $21_1$, the processing proceeds to the step S24, where whether the information indicating locations of the corresponding base stations $11_1$ to $11_n$ is recorded in the base station information table 25b or not is checked. When the information indicating locations of these base stations $11_1$ to $11_n$ is recorded in the base station information table 25b, the processing proceeds to the step S27.

When the information indicating locations of the corresponding base stations $11_1$ to $11_n$ is not recorded in the base station information table 25b, the radio channel control unit 28 acquires the information indicating locations of the corresponding base stations $11_1$ to $11_n$ from the radio communication control unit 14 via the network 40, for example (step S25), stores it into the base station information table 25b (step S26), and the processing proceeds to the step S27.

Note that, instead of acquiring the information indicating locations of the corresponding base stations $11_1$ to $11_n$ from the radio communication control unit 14 via the network 40 at the step S25, the locations of the base stations $11_1$ to $11_n$ may be acquired according to the cell IDs or the like in the signals received from the base stations $11_1$ to $11_n$ by the receiver 50, for example. Also, the processing of these steps S24 to S26 is executed for each one of the base stations $11_1$ to $11_n$ within the cell $23_1$. In this way, a state in which the information indicating locations of all of the base stations $11_1$ to $11_n$ within the cell $23_1$ is stored in the base station information table 25b is realized before the step S27 is executed, similarly as in the communication channel allocation processing shown in FIG. 4 described above.

At the step S27, the radio channel control unit 28 checks whether the location information of the mobile terminal device 22 is stored in the terminal location table 25a or not. When the location information of the mobile terminal device 22 is stored in the terminal location table 25a, the processing proceeds to the step S30.

When the location information of the mobile terminal device 22 is not stored in the terminal location table 25a, the radio channel control unit 28 requests the location information of the mobile terminal device 22 (step S28) and stores the location information supplied in response to this into the terminal location table 25a (step S29), and the processing proceeds to the step S30. The request for the location information of the mobile terminal device 22 may be made directly to the mobile terminal device 22 through the base station control unit 26, for example, or may be made to a management server device or the like for managing the location of each mobile terminal device 22 through the network 30, for example.

When the locations of the base stations $11_1$ to $11_n$ and the mobile terminal device 22, the radio channel control unit 28 obtains a distance (D33) between each one of the base stations $11_1$ to $11_n$ and the mobile terminal device 22 at the step S30.

After the distance (D33) between each one of the base stations $11_1$ to $11_n$ and the mobile terminal device 22 is obtained in this way, the radio channel control unit 28 selects a communication channel to be allocated to the uplink from the mobile terminal device 22 at the step S31 and subsequent steps.

Here, it is assumed that $1 \leq u \leq v \leq k$ and d33min≦d33max, where u and v are arbitrary integers, which are numbers to be set up in order to make the channel set up easier by dividing the channels that can be used by the radio communication system 20 into three regions. Also, d33max is a distance between each one of the base stations $11_1$ to $11_n$ and the mobile terminal device 22 under the condition of not causing interferences to the base stations $11_1$ to $11_n$ even when the communication channel closest to the frequency band to be used by the radio communication system 10 (chA1, in FIG. 3 described above) is used as the communication channel for the uplink from the mobile terminal device 22, and this d33max is obtained by experiments, for example.

First, at the step S31, the radio channel control unit 28 judges whether all of the distances (D33) between the base stations $11_1$ to $11_n$ and the mobile terminal device 22 obtained at the step S30 are greater than a prescribed threshold (d33max) or not.

When all of the distances (D33) between the base stations $11_1$ to $11_n$ and the mobile terminal device 22 are greater than the prescribed threshold (d33max), it is possible to consider that all the base stations $11_1$ to $11_n$ within the cell $23_1$ of the base station $21_1$ will not be receiving interferences by the communication channel for the uplink from the mobile terminal device 22. For this reason, the radio channel control unit 28 allocates available channel among the communication channels (chA1, to chAu) close to the frequency band to be used by the radio communication system 10 as the communication channel for the uplink from the mobile terminal device 22 at the step S32, and the communication channel allocation processing is finished. The allocated communication channel is notified to the base station control unit 26 and the transmission for the uplink from the mobile terminal device 22 is started.

On the other hand, when any of the distances (D33) between the base stations $11_1$ to $11_n$ and the mobile terminal device 22 is less than or equal to the prescribed threshold (d33max), the radio channel control unit 28 judges whether any of the distances (D33) between the base stations $11_1$ to $11_n$ and the mobile terminal device 22 obtained at the step S30 is less than or equal to a prescribed threshold (d33min) or not.

When any of the distances (D33) between the base stations $11_1$ to $11_n$ and the mobile terminal device 22 is less than or equal to the prescribed threshold (d33min), if the communication channel close to the frequency band to be used by the radio communication system 10 is allocated as the communication channel for the uplink from the mobile terminal device 22, it is possible to consider that this one of the base stations $11_1$ to $11_n$ for which the distance (D33) from the mobile terminal device 22 is less than the prescribed distance (d33min) will be receiving interferences by the communication channel from the mobile terminal device. For this reason, the radio channel control unit 28 allocates available channel among the communication channels (chAv to chAk) far from the frequency band to be used by the radio communication system 10 as the communication channel for the uplink from the mobile terminal device 22 at the step S34, and the communication channel allocation processing is finished. The allocated communication channel is notified to the base station control unit 26 and the transmission for the uplink from the mobile terminal device 22 is started.

On the other hand, when both of the conditions of the step S31 and the step S33 described above are not satisfied, i.e., when all the distances (D33) between the base stations $11_1$ to $11_n$ and the mobile terminal device 22 are greater than d33min and any of the distances (D33) between the base stations $11_1$ to $11_n$ and the mobile terminal device 22 is less than or equal to d33max, the processing proceeds to the step S35 where the radio channel control unit 28 allocates available channel among the communication channels (chAu+1 to chAv−1) other than those that can be allocated by the step S32 and the step S34 described above as the communication channel for the uplink from the mobile terminal device 22, and the communication channel allocation processing is finished. The allocated communication channel is notified to the base station control unit 26 and the transmission for the uplink from the mobile terminal device 22 is started.

Also, the communication channel allocation processing from the step S21 to the step S35 of FIG. 5 described above will be executed for each mobile terminal device 22 separately. In this way, the appropriate communication channels for the uplink can be set up even when a plurality of mobile terminal devices 22 exist.

As described above, in this communication channel allocation processing of FIG. 5, similarly as in the processing of FIG. 4 described above, if any of the distances between the base stations $11_1$ to $11_n$ and the mobile terminal device 22 is less than or equal to a prescribed distance (d33min), the communication channel far from the frequency band that can be used by the radio communication system 10 is allocated as the communication channel for the uplink from the mobile terminal device 22.

Consequently, in this communication channel allocation processing, the reduction of the interferences caused to the base stations $11_1$ to $11_n$ of the radio communication system 10 can also be realized easily.

Also, in this communication channel allocation processing, the allocation of the communication channel for the uplink from the mobile terminal device 22 can be made according to the distance between each one of the base stations $11_1$ to $11_n$ and the mobile terminal device 22. Consequently, it is possible to realize the communication channel allocation that accounts for the actual utilization state of radio signals, for example, so that it is possible to contribute to the improvement of the spatial utilization efficiency of radio signals.

Note that the above description is directed to the case where the frequency band to be used by the radio communication system 10 is lower than the frequency band to be used by the radio communication system 20, but this relationship can be reversed. In such a case, it suffices to switch the communication channels to be allocated at the step S14 and the step S16 in FIG. 4 described above, and switch the communication channels to be allocated at the step S32 and the step S34 in FIG. 5 described above.

Note also that, in the above description, the present invention has been described from a viewpoint of reducing interferences to be caused by the radio communication system 20 to the radio communication system 10, but the present invention is also applicable to the case of reducing interferences to be caused by the radio communication system 10 to the radio communication system 20.

For example, FIG. 1 described above is directed to the case where the transmission output of the base stations $11_1$ to $11_n$ of the radio communication system 10 is extremely smaller than the transmission output of the base stations $21_1$ to $21_m$ of the radio communication system 20 and the cells $13_1$ to $13_n$ are contained within the cell $23_1$, but there can be cases where the transmission output of the base stations $21_1$ to $21_m$ is smaller than the transmission output of the base stations $11_1$ to $11_n$. In such cases, the cells $23_1$ to $23_m$ are going to be contained within the cell $13_1$.

Note also that the spurious components such as higher harmonic components, the intermodulation components, etc., that are caused by the non-linearity of the amplifier, for example, are also generated from the base stations $11_1$ to $11_n$ and the mobile terminal device 12 of the radio communication system 10 as well.

When these spurious components from the radio communication system 10 are generated within the frequency band to be used as the uplink frequency by the radio communication system 20, the interferences will be caused to the radio communication system 20.

For this reason, under such a condition, the radio communication control unit 14 on the radio communication system 10 side is formed similarly as the radio communication control unit 24 described above. Using this radio communication control unit 14, the communication channel allocation processing similar to that of FIG. 4 or FIG. 5 described above is carried out when the base stations $21_1$ to $21_m$ exist within the cell $13_1$, for example.

In this way, it is possible to detect a state that can potentially cause interferences from the radio communication system 10 to the radio communication system 20 within the cell $13_1$ easily, and realize the reduction of interferences to be caused from the radio communication system 10 to the radio communication system 20 easily.

According to one communication channel allocation method of the first embodiment, a distance between a first radio base station and a second radio base station is detected, and when the detected distance is less than a first threshold, a distance between the second radio base station and a mobile terminal device is detected, and when the detected distance is less than a second threshold, a communication channel of a frequency far from a first frequency band is allocated to communications between the second radio base station and the mobile terminal device.

In this way, the reduction of interferences to be caused to the first radio base station by the communications between the second radio base station and the mobile terminal device can be realized easily.

Also, by carrying out such a communication channel allocation, it is possible to relax the characteristic required to the filter of the mobile terminal device. Consequently, it is possible to contribute to the reduction of the size and the power consumption of the mobile terminal device.

Also, according to another communication channel allocation method of the first embodiment, a distance between a first radio base station and a mobile terminal device is detected, and when the detected distance is less than a prescribed threshold, a communication channel of a frequency far from a first frequency band is allocated to communications between the second radio base station and the mobile terminal device.

In this way, the reduction of interferences to be caused to the first radio base station by the communications between the second radio base station and the mobile terminal device can be realized easily.

Also, by carrying out such a communication channel allocation, it is possible to relax the characteristic required to the filter of the mobile terminal device. Consequently, it is possible to contribute to the reduction of the size and the power consumption of the mobile terminal device.

In addition, it is possible to realize the communication channel allocation that accounts for the actual utilization state of radio signals, according to the distance between the first radio base station and the mobile terminal device, so that it is possible to contribute to the improvement of the spatial utilization efficiency of radio signals.

Referring now to FIG. 6 to FIG. 14, the second embodiment of the radio communication system according to the present invention will be described in detail.

In the first embodiment described above, when a covered area of a base station of one radio communication system contains a plurality of base stations of another radio communication system under an environment in which two radio systems using close frequency bands exist, a frequency of a channel to be used for communications between the base station of the one radio communication system and the mobile terminal device is controlled according to a distance between the base station of the one radio communication system and the base station of the another radio communication system and a distance between the base station of the one radio communication system and the mobile terminal device, so as to reduce interferences to be caused to the another radio communication system while avoiding the complication of the device configuration.

However, in this communication channel allocation method, the appropriate channel allocation becomes difficult under an environment in which a cell of the base station of the one radio communication system contains many base stations of the another radio communication system because there are so many base stations of the another radio communication system whose distances should be accounted for the purpose of the channel control. As a result, there is some possibility for causing interferences to the another radio communication system. The second embodiment is directed to the communication channel allocation method for resolving this problem.

Figure 6:
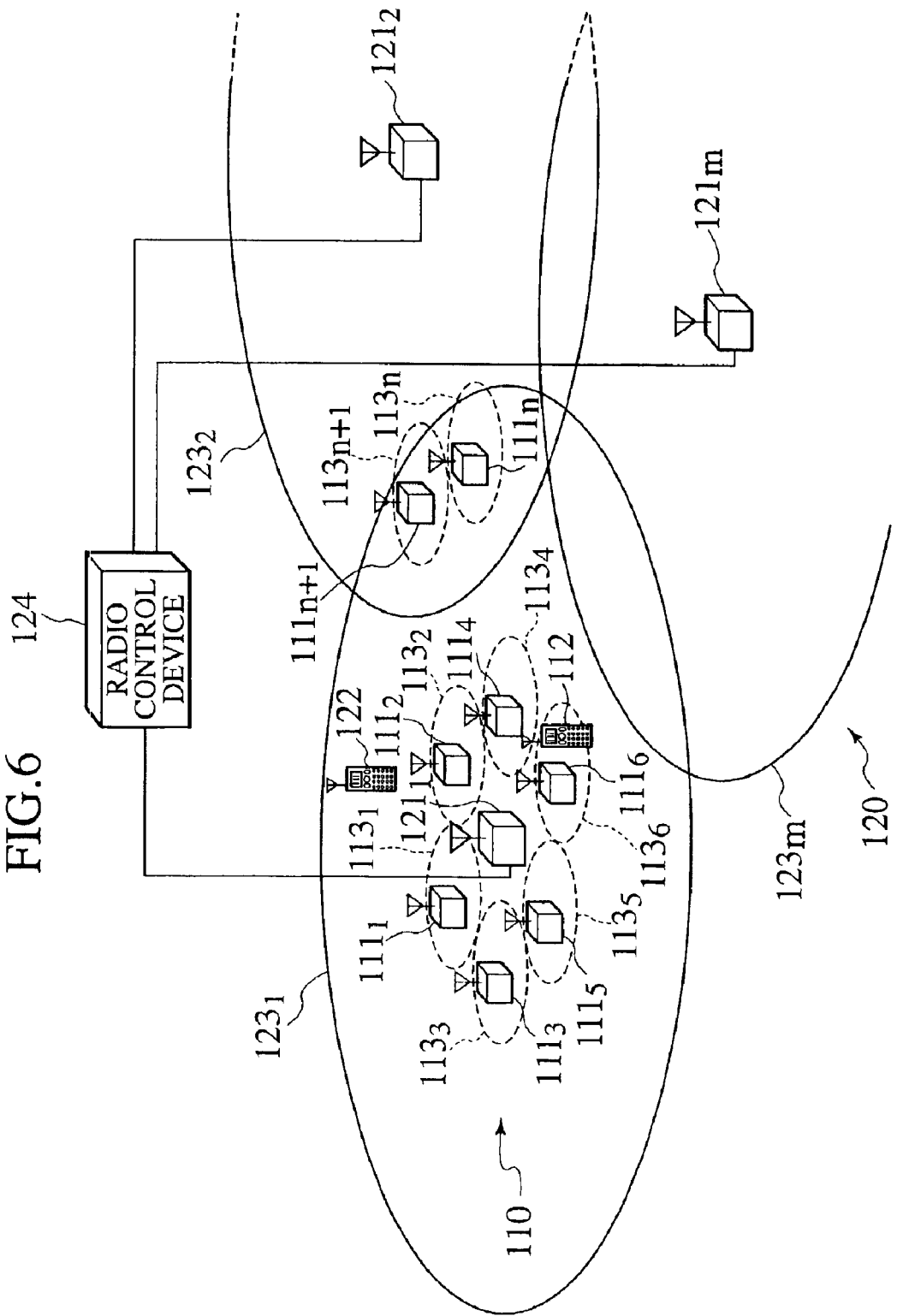
FIG. 6 is a diagram showing a configuration of a radio communication system according to the second embodiment of the present invention.

The present invention is applicable to the communication channel allocation, the communication control, etc., in a communication system operated under an environment in which another communication system using the close frequencies is existing, as shown in FIG. 6, for example.

The other radio communication system 110 has a plurality of base stations $111_1$ to $111_n$ for providing the communication services, for example, and a mobile terminal device 112 for utilizing the communication services provided by the base stations $111_1$ to $111_n$.

The radio communication system 110 is the PHS (Personal Handyphone System), for example, which uses radio signals of 1.9 GHz band (1.89365 to 1.91945 GHz), for example, for the communications between the base stations $111_1$ to $111_n$ and the mobile terminal device 112. Also, this radio communication system 110 uses the TDMA (Time Division Multiple Access) scheme in order to carry out communications between one base station and a plurality of mobile terminal devices. For channels for carrying out communications by such a TDMA scheme, a frequency band of 300 KHz is used per one channel, for example.

For the base stations $111_1$ to $111_n$, respective areas (cells) $113_1$ to $113_n$ are allocated. Also, the base stations $111_1$ to $111_n$ are connected through a communication line.

Each one of the base stations $111_1$ to $111_n$ provides a connection service for the Internet, a wired communication network, another radio communication network, etc. (which will be simply referred to as a communication service hereafter), for example, with respect to the mobile terminal device 112 within a corresponding one of the cells $113_1$ to $113_n$.

Also, the radio communication system 120 has a plurality of base stations $121_1$ to $121_m$ for providing the communication services, a mobile terminal device 122 for utilizing the communication services provided by the base stations $121_1$ to $121_m$, and a radio communication control unit 124 for carrying out a control of radio communications between the base stations $121_1$ to $121_m$ and the mobile terminal device 122.

In the radio communication system 120, a plurality of channels with different frequencies are provided, for example, in order to carry out communications between one base station 121 and a plurality of mobile terminal devices 122, and radio signals of 2 GHz band immediately above the 1.9 GHz band is used, for example, for the communications between the base stations $121_1$ to $121_m$ and the mobile terminal device 122. It is also possible to realize the TDD (Time Division Duplex) by dividing one frequency channel into uplink and downlink time-slots. It is also possible to divide one frequency channel into more than two time-slots to provide a plurality of logical channels that can be used for communications with a plurality of mobile terminal devices 122.

For the base stations $121_1$ to $121_m$, respective areas (cells) $123_1$ to $123_m$ are allocated. Also, each one of the base stations $121_1$ to $121_m$ is connected to the radio communication control unit 124 through a wired or wireless communication line.

Each one of the base stations $121_1$ to $121_m$ provides a connection service for the Internet, a wired communication network, another radio communication network, etc. (which will be simply referred to as a communication service hereafter), for example, with respect to the mobile terminal device 122 within a corresponding one of the cells $123_1$ to $123_m$, through the radio communication control unit 124.

Here, the radio communication system 110 uses radio signals with smaller transmission power compared with the radio communication system 120. For example, the transmission output of the mobile terminal device 112 of the radio communication system 110 is about 10 mW, for example, which is extremely small compared with the transmission output of the mobile terminal device 122 of the radio communication system 120. Also, the transmission power of the base stations $111_1$ to $111_n$ is small compared with the transmission power of the base stations $121_1$ to $121_m$.

For this reason, the cells $113_1$ to $113_n$ corresponding to the base stations $111_1$ to $111_n$ are smaller than the cells $123_1$ to $123_m$ corresponding to the base stations $121_1$ to $121_m$, and a plurality of cells $113_1$ to $113_n$ are arranged within the cell $123_1$.

Note that the number of the mobile terminal devices 112 and 122 are not limited to those shown in FIG. 6 and it is possible to use arbitrary number of mobile terminal devices 112 and 122 within a range of the channels allocated to each one of the base stations $111_1$ to $111_n$ and the base stations $121_1$ to $121_m$.

Figure 7:
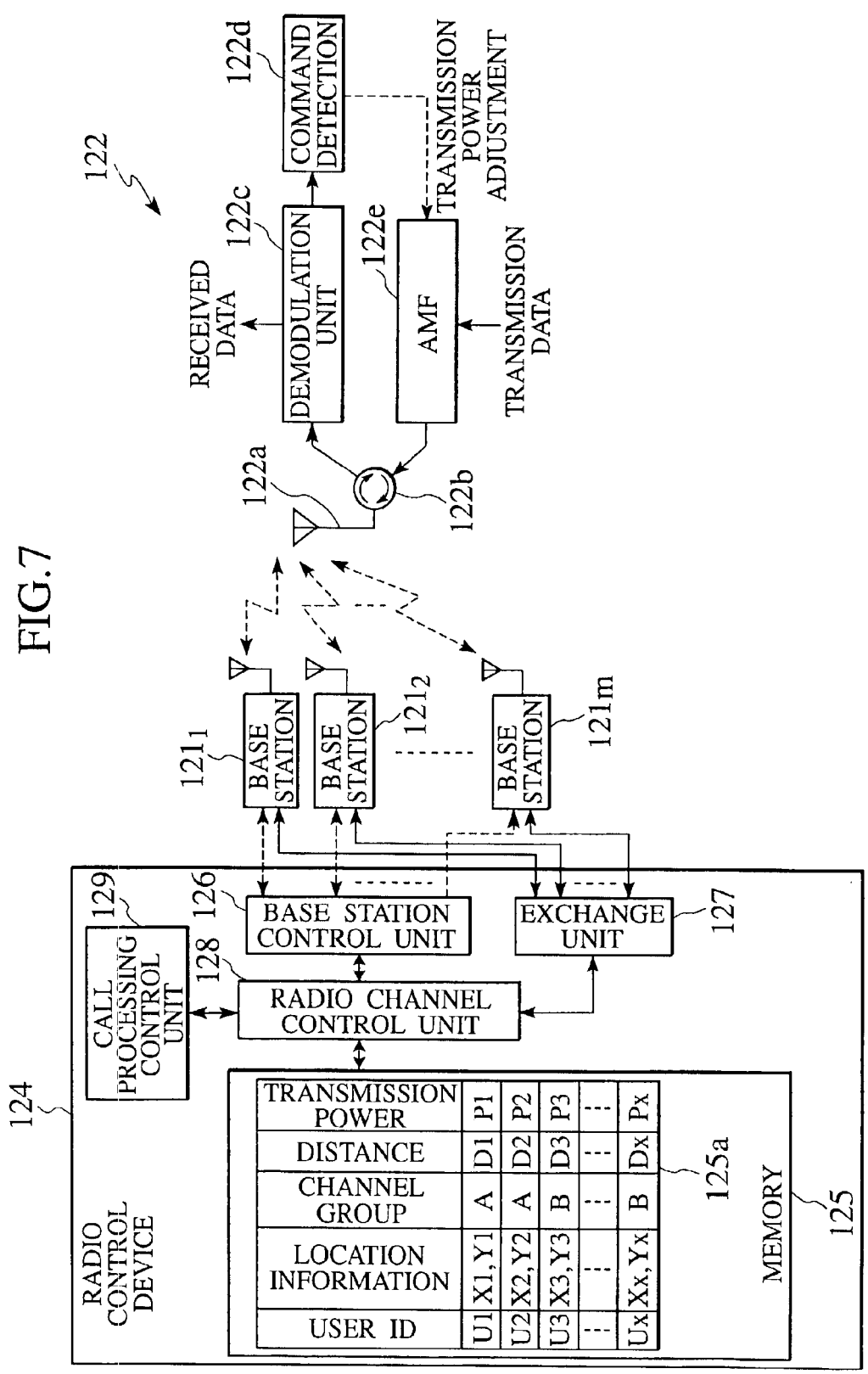
FIG. 7 is a block diagram showing a configuration of a radio control device in the radio communication system of FIG. 6.

The radio communication control unit 124 has a configuration shown in FIG. 7, for example, which has a memory 125 for storing information such as information (location, information) indicating a location of the mobile terminal device 122 of each user, a base station control unit 126 for controlling operations of the base stations $121_1$ to $121_m$, an exchange unit 127 for controlling communications between the base stations $121_1$ to $121_m$ and a network 130 or the like, a radio channel control unit 128 for controlling communication channels to be used for communications between the base stations $121_1$ to $121_m$ and the mobile terminal device 122, and a call processing control unit 129 for carrying out a control of a call termination for the mobile terminal device 122 or a call originating from the mobile terminal device 122.

The memory 125 stores a terminal location table 125a for indicating the location information that indicate locations and the currently used channel group (chA, chB), etc., of the mobile terminal devices 122 that are using the radio communication system 120, and a table (base station information table) for indicating information such as locations and communication channels in use of the base stations $121_1$ to $121_m$.

The location information of each mobile terminal device 122 stored in the terminal location table 125a is expressed by a combination of X-coordinate and Y-coordinate (Xi, Yi [i=1, 2, . . . , x]) within the service providing region for providing the communication services with respect to the mobile terminal device 122, for example. The mobile terminal device 122 obtains its own location according to strengths of radio signals from a plurality of base stations $121_1$ to $121_m$ and locations of these base stations $121_1$ to $121_m$, for example, and supplies it to the radio communication control unit 124 along with an identification information (user ID unique to the individual mobile terminal device 122, for example: Ui [i=1, 2, . . . , x]) assigned to that mobile terminal device 122. The radio communication control unit 124 stores the supplied identification information and location information into the terminal location table 125a through the base station control unit 126 and the radio channel control unit 128.

Alternatively, it is also possible to provide a location detection unit such as the so called GPS (Global Positioning System) to the mobile terminal device 122 and supplies the location of the mobile terminal device 122 detected by this location detection unit to the radio communication control unit 124 similarly as described above. The information indicating the location from the mobile terminal device 122 is supplied to the radio communication control unit 124 at a prescribed time interval, for example, such that the location of the mobile terminal device 122 stored in the terminal location table 125a is regularly updated accordingly.

Now, in the radio communications, it is preferable to use the transmission power that is minimum necessary in order to prevent interferences and mixing. On the other hand, in order to receive signals from the mobile terminal device 122 surely at the base station 121, there is a need to make the signal to interference ratio (SIR) above a prescribed amount. For this reason, this radio communication system 120 is made to control the transmission power of the mobile terminal device 122 to an appropriate value.

The SIR is different depending on the power observed at the receiving side station and the power of noises. The noise power is obtained by measuring the power of components other than the channels actually used for communications, for example.

Also, the power observed at the receiving side station is different depending on the spatial propagation loss of radio signals, so that it is changed according to a distance between the transmitting station and the receiving station. When the mobile terminal device 122 is the transmitting station, the base station $121_1$ is the receiving station, and the noise power is the same for both, in order to make the power to be received by the base station $121_1$ constant, there is a need to make the transmission power of the mobile terminal device 122 large when the distance between the mobile terminal device 122 and the base Ction $121_1$ is large and to make the transmission power of the mobile terminal device 122 small when the distance between the mobile terminal device 122 and the base Ction $121_1$ is small.

For this reason, in this radio communication system 120, the transmission power (Pi[i=1, 2, ..., x]) of the mobile terminal device 122 is controlled to make a constant SIR for signals from the mobile terminal device 122 that is carrying out communications with each of the base stations $121_1$ to $121_m$. The transmission power control of the mobile terminal device 122 is realized as the base station $121_1$ supplies a command for controlling the power to the mobile terminal device 122 and the mobile terminal device 122 controls the transmission power according to this command, for example. In this way, the transmission power of the mobile terminal device 122 is controlled to be large when the distance Di is large and the transmission power of the mobile terminal device 122 is controlled to be small when the distance Di is small.

As described above, the radio communication system 110 and the radio communication system 120 are using close frequencies. Also, as described above, the transmission output of the mobile terminal device 112 of the radio communication system is small compared with the transmission output of the mobile terminal device 122 of the radio communication system 120, so that there are cases where the large noises are caused to the radio communication system 110 side even when the components outside the prescribed frequency band are attenuated to a sufficient level at the radio communication system 120 side.

Also, because the transmission power of the mobile terminal device 122 is larger than the transmission power of the mobile terminal device 112, there are cases where the so called receiver blocking occurs at the receiver of the base stations $111_1$ to $111_n$ to lower the reference sensitivity, depending on the conditions.

More specifically, the interference power due to radio signals from the mobile terminal device 122 that are received by the base stations $111_1$ to $111_n$ in a vicinity of the base station $121_1$ varies according to the transmission power of the mobile terminal device 122 and the distances between the mobile terminal device 122 and the base stations $111_1$ to $111_n$. As described above, the transmission power of the mobile terminal device 122 is controlled to be large when the distance Di between the mobile terminal device 122 and the base station $121_1$ is large, and small when the distance Di is small. Consequently, the interference power received from the mobile terminal device 122 by the base stations $111_1$ to $111_n$ in a vicinity of the base station $121_1$ is large when the distance Di between the mobile terminal device 122 and the base station $121_1$ is Also, the interference power due to radio signals from the mobile terminal device 122 that are received by the base stations $111_1$ to $111_n$ in a vicinity of the base station $121_1$ has correlation with a frequency of the channel used for communications between the mobile terminal device 122 and the base station $121_1$ and frequencies of the channels used by the base stations $111_1$ to $111_n$. The interference power is large when these frequencies are close, and the interference power is small when they are separated.

Figure 8:
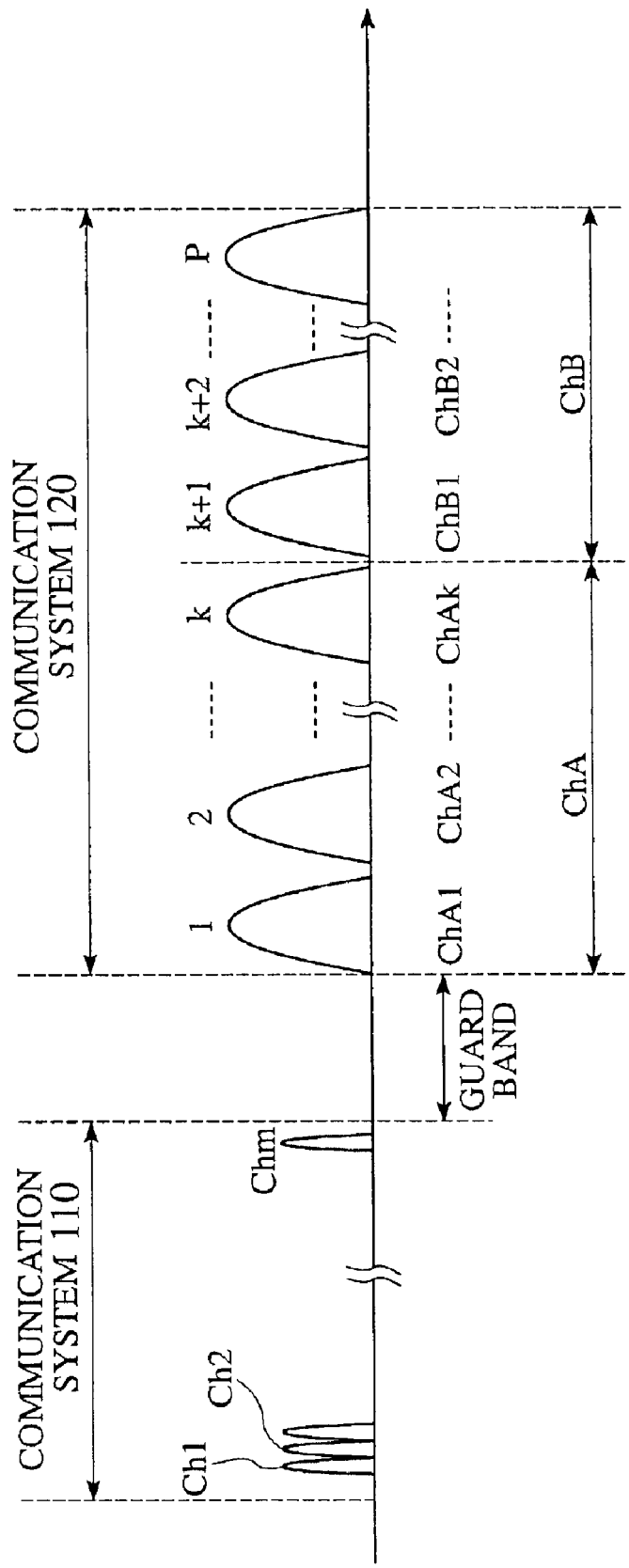
FIG. 8 is a diagram showing exemplary communication channels to be used in the radio communication system of FIG. 6.

As shown in FIG. 8, for example, the radio communication system 120 uses the frequency band of 2 GHz band immediately above the frequency band (1.9 GHz band, for example) used by the radio communication system 10. Also, as shown in FIG. 8, a frequency band (guard band) that is not to be used by either radio communication system is provided between the frequency band to be used by the radio communication system 110 and the frequency band to be used by the radio communication system 120. This guard band has a bandwidth of 5 MHz, for example. Note that FIG. 8 shows the spectrum intensities for the radio communication system 110 and the radio communication system 120 in different scales, for the sake of making this relationship of frequencies easily comprehensible.

When the frequency close to the frequency band to be used by the radio communication system 110 is used between the mobile terminal device 122 and the base station $121_1$, the interference power to be received by the base stations $111_1$ to $111_n$ in a vicinity of the base station $121_1$ becomes large. Conversely, when the frequency far from the frequency band to be used by the radio communication system 110 is used between the mobile terminal device 122 and the base station $121_1$, the interference power to be received by the base stations $111_1$ to $111_n$ in a vicinity of the base station $121_1$ becomes small. This is due to the fact that the strength of the spurious components such as higher harmonic components, the intermodulation components, etc., that are caused by the non-linearity of the amplifier of the radio communication device or the like becomes lower as they are more separated from the carrier frequency.

As described above, the interference power received by the base stations $111_1$ to $111_n$ also varies according to the distance between the mobile terminal device 122 and the base station $121_1$. For this reason, this radio communication system 120 is made such that a channel of a frequency far from the frequency band to be used by the radio communication system 110 is allocated to communications between the mobile terminal device 122 and the base station $121_1$ when the distance between the mobile terminal device 122 and the base station $121_1$ is large, and a channel of a frequency close to the frequency band to be used by the radio communication system 110 is allocated to communications between the mobile terminal device 122 and the base station $121_1$ when the distance between the mobile terminal device 122 and the base station $121_1$ is small.

Such a channel allocation can be realized by judging the frequency of the channel used by each mobile terminal device 122, and controlling the channel allocation by the radio channel control unit 128, for example.

In order to reduce the control load, it is also possible to divide the channels that can be used by the radio communication system 120 into a group of those close to the frequency band to be used by the radio communication system 110 and a group of those far from the frequency band to be used by the radio communication system 110, such that available channel within each group (channel group) is allocated. More specifically, as shown in FIG. 8 described above, p channels that can be used in this radio communication system 120 are divided into a channel group close to the frequency band to be used by the radio communication system 110 (ChA[chA1, chA2, . . . , chAk]) and a channel group far from the frequency band to be used by the radio communication system 110 (ChB[chB1, chB2, . . . ]).

Figure 9:
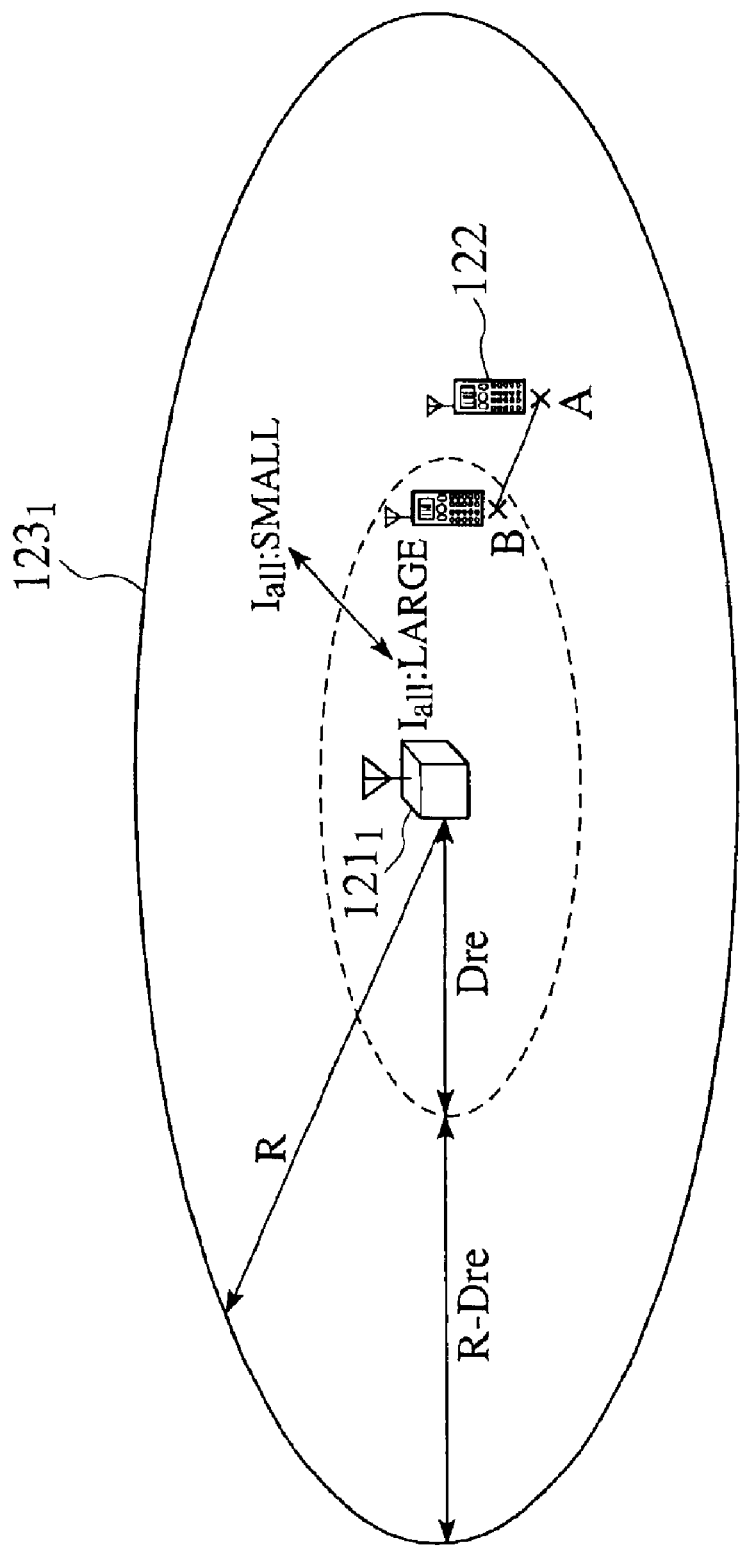
FIG. 9 is a diagram showing a channel switching distance to be used in the radio communication system of FIG. 6.

In order to reduce the control load further, it is also possible to a method in which the number (N) of all the mobile terminal devices 122 that are carrying out communications with the base station $121_1$ which is carrying out communications with the channel allocation control target mobile terminal device 122, the interference power ($I_{a\,I\,I}$) of the signals other than the transmission signals from the channel allocation control target mobile terminal device 122 is measured, channel allocation rates ($\alpha 1$, $\alpha 2$) for the channel group ChA and the channel group ChB are obtained according to this interference power $I_{a\,I\,I}$ and the number N described above, a prescribed threshold (channel switching distance Dre) is set up in advance according to these channel allocation rates as shown in FIG. 9, for example, a channel in the channel group ChA is allocated when the distance Di between the mobile terminal device 122 and the base station $121_1$ is less than the channel switching distance Dre, or a channel in the channel group ChB is allocated when the distance Di is greater than or equal to the channel switching distance Dre.

Figure 10:
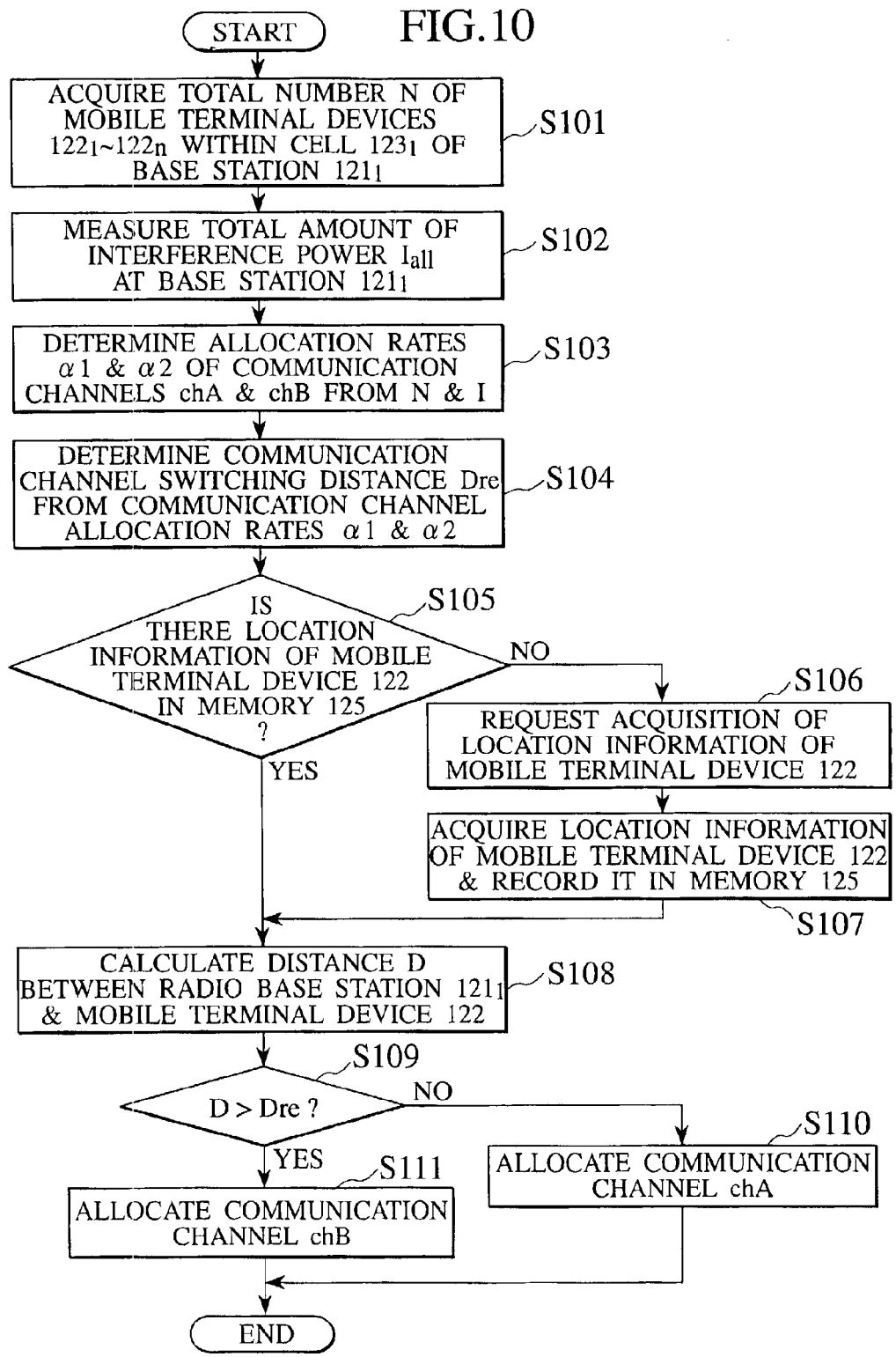
FIG. 10 is a flow chart for an exemplary communication channel allocation processing in the radio communication system of FIG. 6.

Such a communication channel allocation processing is carried out according to the procedure shown in FIG. 10, for example, such that when the mobile terminal device 122 generates a call with respect to the base station $121_1$, the processing is carried out from the step S101 of FIG. 10. Note that, in the following, the case where a call is generated with respect to one base station $121_1$ will be described for the sake of simplicity, but there can be cases where one mobile terminal device 122 generates calls with respect to a plurality of base stations 121 when the communication scheme capable of using a plurality of frequencies is used.

In the terminal location table 125a in the memory 125 described above, the mobile terminal devices 122 within the cells $123_1$ to $123_m$ of the base stations $121_1$ to $121_m$ and the channel used by each mobile terminal device 122 are stored separately. The radio channel control unit 128 obtains the number N of the mobile terminal devices 122 within the cell $123_1$ of the base station $121_1$ according to this table (step S101).

When the number N of the mobile terminal devices 122 within the cell $123_1$ is obtained, the radio channel control unit 128 measures the total (interference power) $I_{a\,I\,I}$ of the received power of signals other than those of the mobile terminal device 122 that has generated the call (step S102). The interference power $I_{a\,I\,I}$ so measured is supplied to the radio channel control unit 128 through the base station control unit 126, for example.

When the interference power $I_{a\,I\,I}$ is supplied, the radio channel control unit 128 obtains the allocation rates ($\alpha 1$, $\alpha 2$) of the channel groups ChA and ChB at this base station $121_1$ according to the number N of the mobile terminal devices 122 and the interference power $I_{a\,I\,I}$ obtained in the above (step S103). Here, $\alpha 1$ and $\alpha 2$ are positive values and have a relationship of $\alpha 1+\alpha 2=1$.

These rates $\alpha 1$ and $\alpha 2$ are determined according to a predetermined function for optimizing the capacities of the radio communication system 110 and the radio communication system 120 when N and $I_{a\,I\,I}$ take particular values, for example.

This function is obtained by the computer simulation by setting the communication conditions appropriately, for example. Else, this function may be set up as a empirical formula obtained by the experiment using the actual communications, for example.

When the allocation rates $\alpha 1$ and $\alpha 2$ for the channel groups ChA and ChB are obtained, the radio channel control unit 128 determines the distance (channel switching distance) Dre for carrying out the switching of the communication channels (step S104).

This channel switching distance Dre is a value that satisfies a relationship of $Dre^2:R^2-Dre^2=\alpha 1:\alpha 2$ where R is a radius of the cell 123, as shown in FIG. 9 described above.

In FIG. 9 described above, within the cell $123_1$, the area of a region for which the distance from the base station $121_1$ is less than or equal to the channel switching distance Dre and the area of a region for which the distance from the base station $121_1$ is greater than the channel switching distance Dre and less than or equal to the cell radius R can be obtained as $\pi\cdot Dre^2$ and $\pi\cdot R^2-\pi\cdot Dre^2$. Consequently, the ratio of the areas of these regions is $Dre^2:R^2-Dre^2$. The channels in the channel groups ChA and ChB are to be allocated respectively to communications between the mobile terminal devices 122 within these regions and the base station $121_1$, the channel allocation rates with respect to the mobile terminal devices 122 within the cell $123_1$ becomes $\alpha 1:\alpha 2=Dre^2:R^2-Dre^2$. Consequently, by setting the channel switching distance Dre that satisfies the above described relationship, the channel allocation rates for the channel groups ChA and ChB within the cell $123_1$ can be $\alpha 1$ and $\alpha 2$ respectively.

When such a channel switching distance Dre is obtained, the radio channel control unit 128 checks whether the location information of the mobile terminal device 122 that has generated the call is registered in the terminal location table 125a or not (step S105), and when it is registered, the radio channel control unit 128 obtains the distance Di between the base station $121_1$ and the mobile terminal device 122 and registers it into the terminal location table 125a (step S108).

When the location information of the mobile terminal device 122 is not registered in the terminal location table 125a, the radio channel control unit 128 requests an acquisition of the location information of the mobile terminal device 122 (step S106), registers the acquired location information of the mobile terminal device 122 into the terminal location table 125a, and executes the processing of the step S108.

When the distance Di between the base station $121_1$ and the mobile terminal device 122 is obtained, the radio channel control unit 128 compares it with the channel switching distance Dre obtained in the above (step S109).

When the distance Di between the base station $121_1$ and the mobile terminal device 122 is less than or equal to the channel switching distance Dre, the transmission power of the mobile terminal device 122 is relatively low as a result of the transmission power control as described above. For this reason, in such a case, even if the channel of a frequency close to the frequency band to be used by the radio communication system 110, i.e., a channel in the channel group ChA, is allocated to communications between the mobile terminal device 122 and the base station $121_1$, the interference power observed at the base stations $111_1$ to $111_n$ in a vicinity of the base stations $121_1$ will be relatively small, and the influence of the interferences due to the transmission signals of the mobile terminal device 122 will be small.

Consequently, when the distance Di between the base station $121_1$ and the mobile terminal device 122 is less than or equal to the channel switching distance Dre, the radio channel control unit 128 allocates available channel in the channel group ChA to communications between the mobile terminal device 122 and the base station $121_1$ (step S110).

On the other hand, when the distance Di between the base station $121_1$ and the mobile terminal device 122 is greater than the channel switching distance Dre, the transmission power of the mobile terminal device 122 is relatively high. For this reason, in such a case, if the channel of a frequency close to the frequency band to be used by the radio communication system 110, i.e., a channel in the channel group ChA, is allocated to communications between the mobile terminal device 122 and the base station $121_1$, the interference power observed at the base stations $111_1$ to $111_n$ in a vicinity of the base stations $121_1$ will be relatively large, and the influence of the interferences due to the transmission signals of the mobile terminal device 122 will be large.

Consequently, when the distance Di between the base station $121_1$ and the mobile terminal device 122 is greater than the channel switching distance Dre, the radio channel control unit 128 allocates available channel in the channel group ChB to communications between the mobile terminal device 122 and the base station $121_1$ (step S111).

In this radio communication system 120, it is possible to reduce the influence of the interferences to be caused to the radio communication system 110 by carrying out the channel allocation as described above.

Now, when the mobile terminal device 122 moves, the distance Di between the base station $121_1$ and the mobile terminal device 122 changes. The radio channel control unit 128 regularly acquires the location information of the mobile terminal device 122 and updates the location information in the terminal location table 125a, for example. Alternatively, the mobile terminal device 122 transmits a new location information to the radio channel control unit 128 upon detecting the moving of the mobile terminal device 122 itself, and the radio channel control unit 128 updates the location information in the terminal location table 125a upon receiving it.

There can be a case where the relationship of the distance Di between the base station $121_1$ and the mobile terminal device 122 and the channel switching distance Dre changes as a result of the moving of the mobile terminal device 122. In such a case, there is a need to switch the channels to be used for communications between the mobile terminal device 122 and the base station $121_1$.

Figure 11:
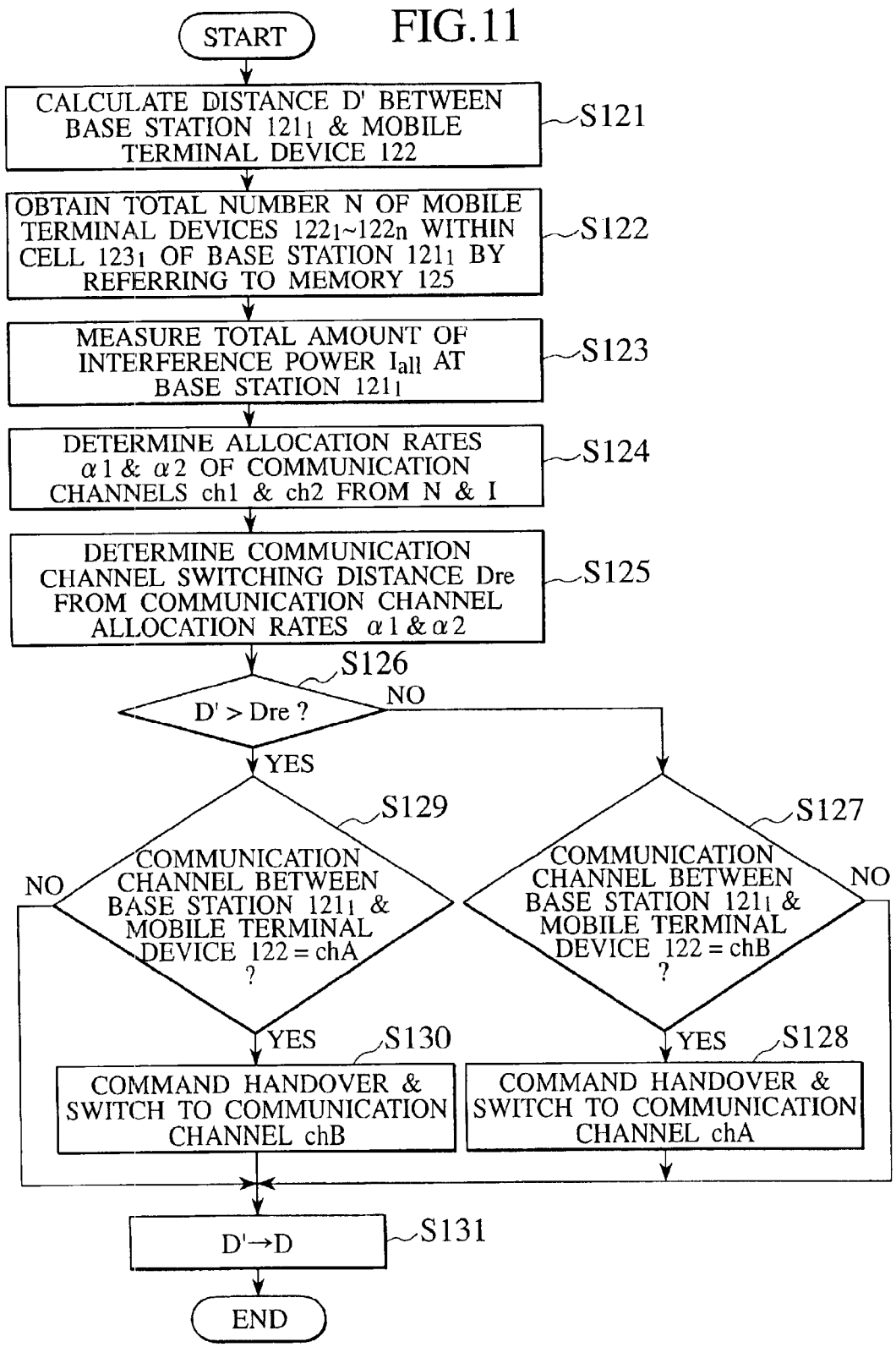
FIG. 11 is a flow chart for an exemplary communication channel switching processing in the radio communication system of FIG. 6.
Figure 12:
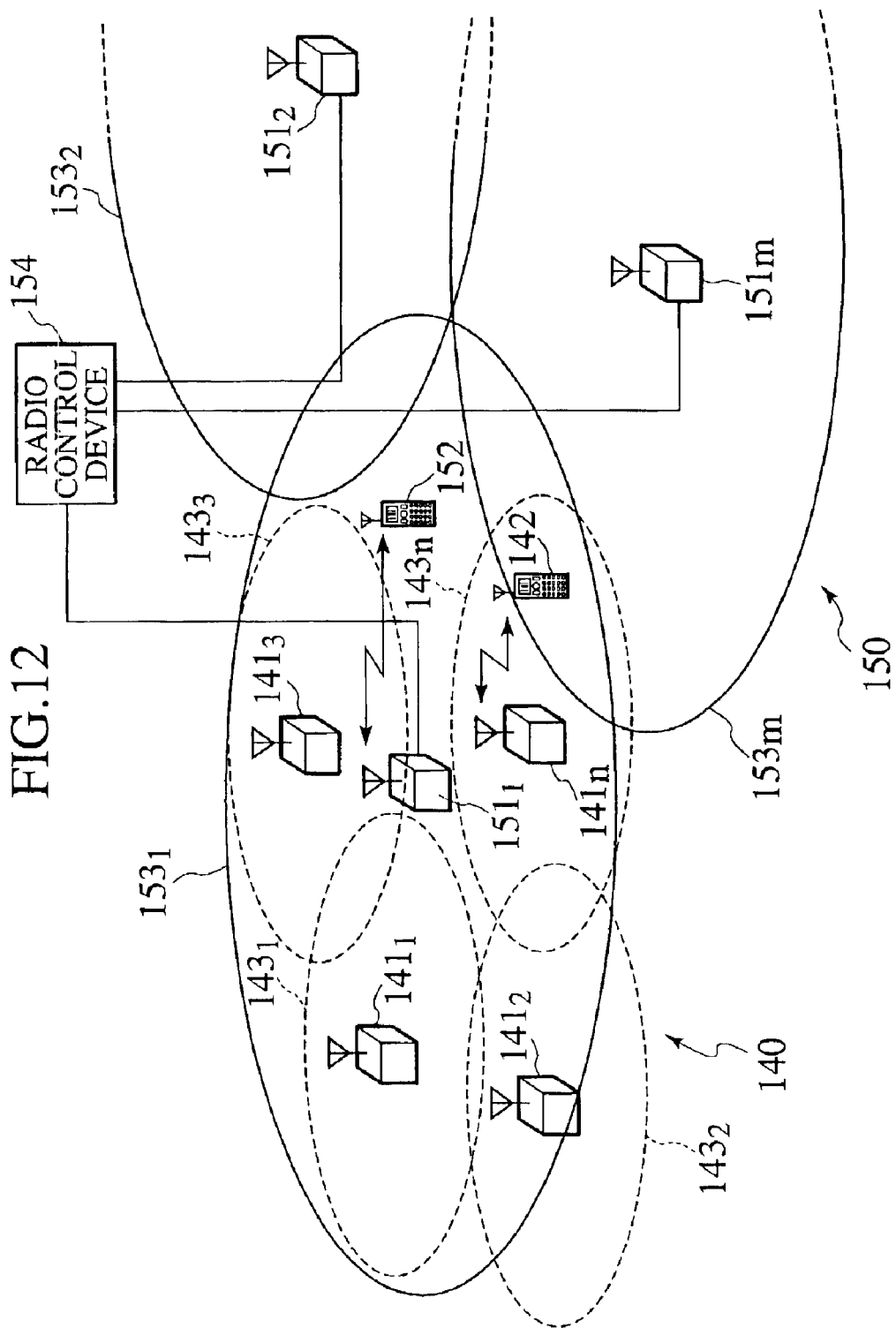
FIG. 12 is a diagram showing one exemplary configuration of the radio communication system according to the first embodiment of the present invention.

FIG. 11 shows the procedure for such a channel switching processing, where the processing is started from the step S121 of FIG. 11 when the location information of the mobile terminal device 122 stored in the terminal location table 125a is changed as the mobile terminal device 122 has moved.

First, the radio channel control unit 128 obtains the current distance Di' between the mobile terminal device 122 and the base station $121_1$ from the updated new location information of the mobile terminal device 122 (step S121).

Then, the radio channel control unit 128 obtains the number N of the mobile terminal devices 122 within the cell $123_1$ of the base station $121_1$ (step S122), obtains the interference power $I_{a\,11}$ at the base station $121_1$ (step S123), obtains the allocation rates α1 and α2 of the channel groups ChA and ChB from N and $I_{a\,11}$ (step S124), and obtains the channel switching distance Dre (step S125), similarly as the steps S101 to S104 of FIG. 10 described above.

When the channel switching distance Dre is obtained, the radio channel control unit 128 compares the distance Di' between the base station $121_1$ and the mobile terminal device 122 obtained in the above with the channel switching distance Dre (step S126).

When the distance Di' between the base station $121_1$ and the mobile terminal device 122 is less than or equal to the channel switching distance Dre, the radio channel control unit 128 checks whether the currently allocated channel is a channel in the channel group ChB or not (step S127), and if it is a channel in the channel group ChB, the radio channel control unit 128 commands the switching to available channel in the channel group ChA (step S128). If the currently allocated channel is a channel in the channel group ChA, it is left unchanged. In this way, a state in which a channel in the channel group ChA is allocated to communications between the mobile terminal device 122 and the base station $121_1$ is realized.

On the other hand, when the distance Di' between the base station $121_1$ and the mobile terminal device 122 is greater than the channel switching distance Dre, the radio channel control unit 128 checks whether the currently allocated channel is a channel in the channel group ChA or not (step S129), and if it is a channel in the channel group ChA, the radio channel control unit 128 commands the switching to available channel in the channel group ChB (step S130). If the currently allocated channel is a channel in the channel group ChB, it is left unchanged. In this way, a state in which a channel in the channel group ChB is allocated to communications between the mobile terminal device 122 and the base station $121_1$ is realized.

When the above processing is finished, the radio channel control unit 128 updates the distance Di in the terminal location table 125a by the current distance Di' obtained in the above.

By this switching processing, even when the mobile terminal device 122 has moved, the channel between the mobile terminal device 122 and the base station $121_1$ can be maintained appropriately.

In the first embodiment described above, as shown in FIG. 12, for example, the channel to be used in one communication system 150 is selected according to the distance between the base station 141 of another communication system 140 and the mobile terminal device 152 of the one communication system.

Figure 13:
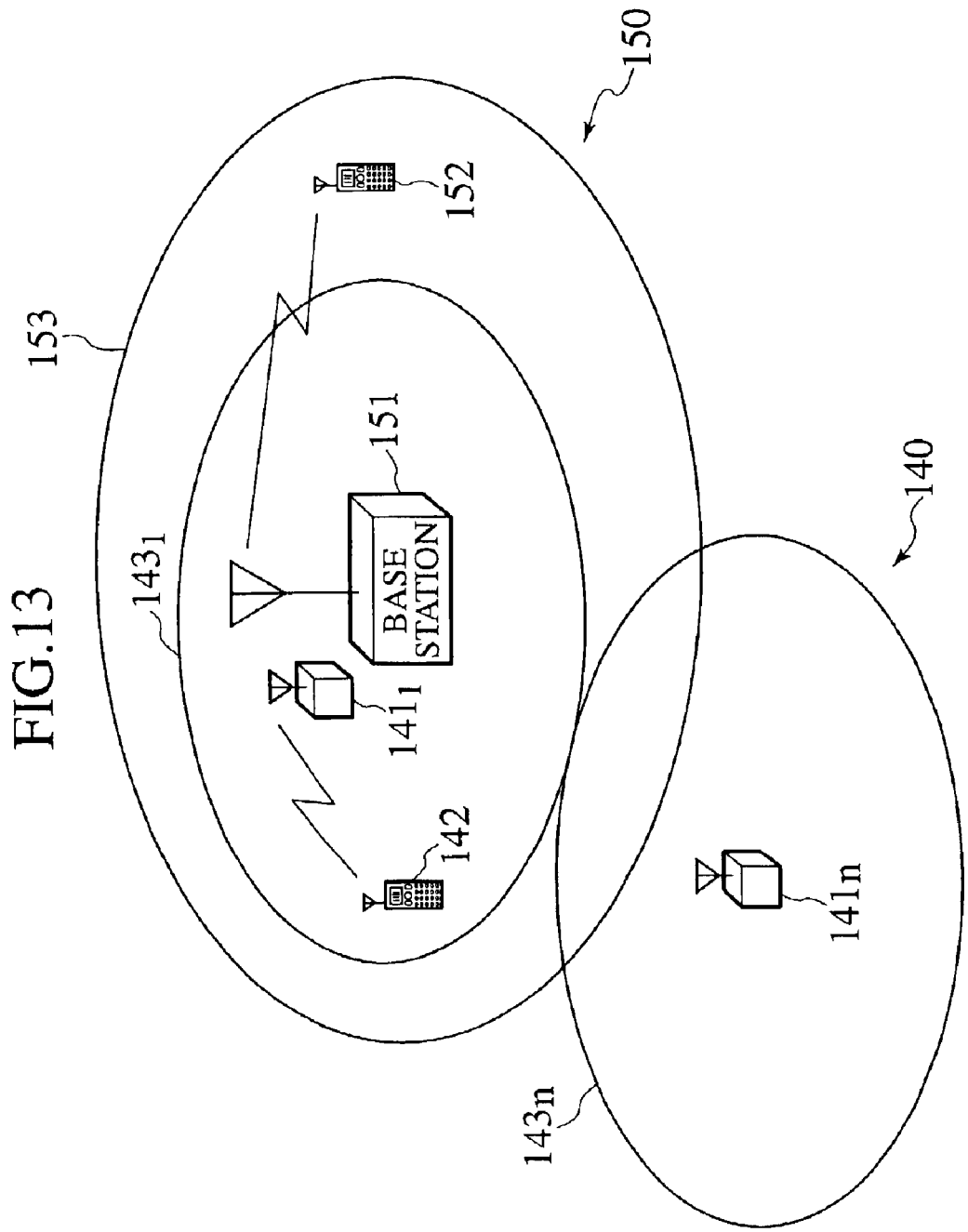
FIG. 13 is a diagram showing another exemplary configuration of the radio communication system according to the first embodiment of the present invention.
Figure 14:
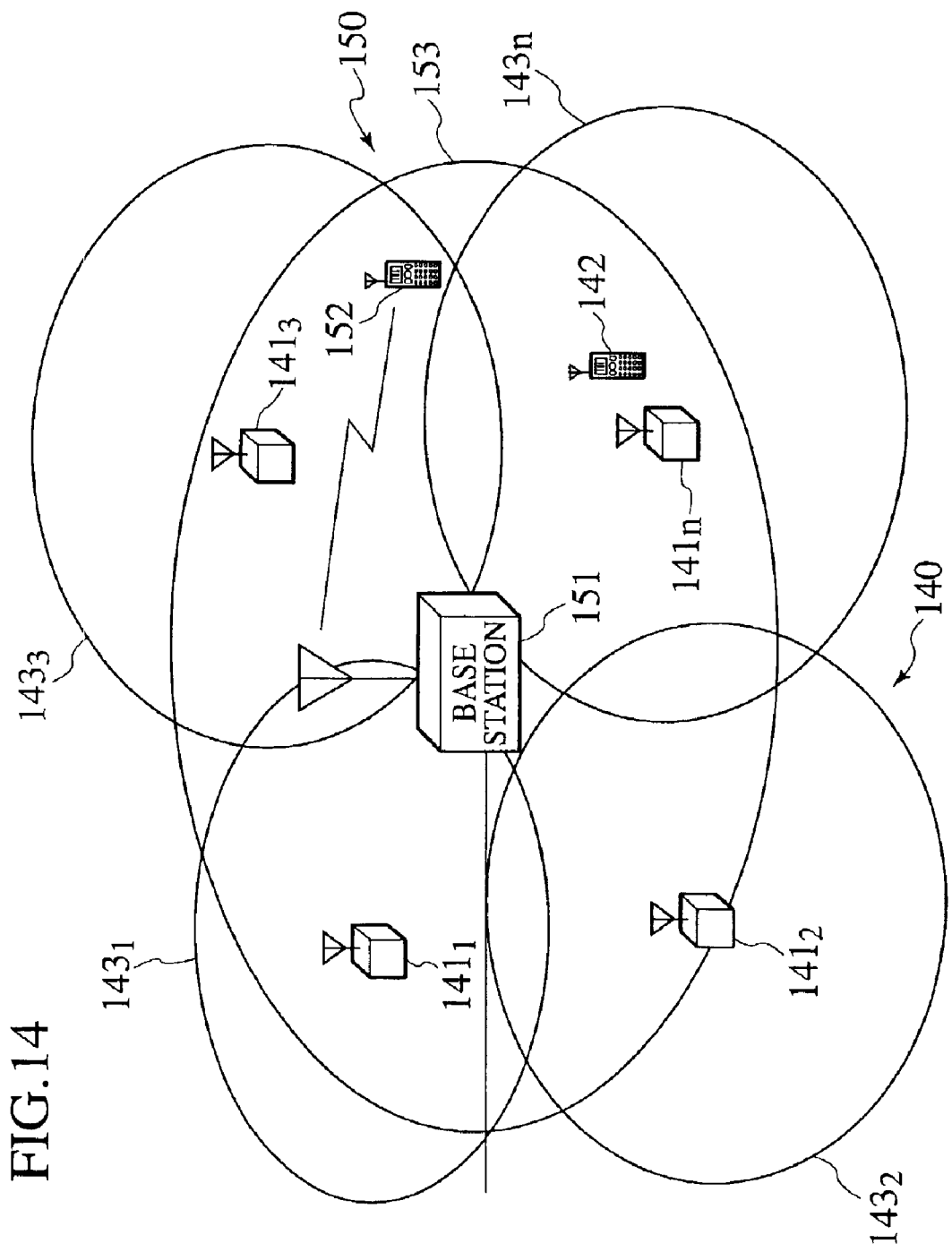
FIG. 14 is a diagram showing another exemplary configuration of the radio communication system according to the first embodiment of the present invention.

This first embodiment is effective in reducing interferences to be caused to the base station 141 by the mobile terminal device 152 when the cell 143 of the base station 141 in the another communication system 140 and the cell 153 of the base station 151 in the one communication system 150 are nearly the same as shown in FIG. 13, for example, or when the sizes of the cell 143 and the cell 153 are hot so different as shown in FIG. 14, for example.

However, under the circumstance as shown in FIG. 6 described above where the cell 113 in the another communication system is extremely small compared with the cell 123 in the one communication system and many cells 113 are contained within the cell 123, there can be cases where the another base station 111 exists near the mobile terminal device 122 even if the base station 111 in a vicinity of the base station 121 and the mobile terminal device 122 are separated. In such cases, there is some possibility for causing interferences to the base station 111 near the mobile terminal device 122 even if interferences are not caused to the base station 111 in a vicinity of the base station 121.

For this reason, in this radio communication system 120, the channel allocation rates α1 and α2 for the close channel group ChA and the far channel group ChB with respect to the frequency band to be used by the radio communication system 110 are determined according to the total received power (interference power $I_{a\,I\,l}$) of signals other than those of the channel allocation target mobile terminal device 122 at the base station $121_1$ and the total number N of the mobile terminal devices 122 within the cell $123_1$ of the base station $121_1$ with respect to which the transmission power of the mobile terminal device 122 is to be controlled, and the channel switching distance Dre is obtained according to them. In addition, in this radio communication system 120, a channel in which one of the channel groups ChA and ChB is to be allocated is determined according to a result of the comparison of this channel switching distance Dre with the distance Di between the base station $121_1$ and the mobile terminal device 122.

By carrying out such a channel allocation, it is possible to reduce interferences to be caused to the another radio communication system 110 easily.

Note that the above description is directed to a configuration in which the radio communication system 120 simply multiplexes a plurality of channels by FDMA, but it is also possible to multiplex the channels by CDMA in which signals in each frequency channel is spread coded. In this case, the bandwidth of each channel to be used by the radio communication system 120 is about 5 MHz, for example, but the frequency channel allocation processing can be carried out similarly as described above.

Note also that the above description is directed to the case where the frequency band to be used by the radio communication system 120 is at higher frequencies than the frequency band to be used by the radio communication system 110, but the present invention is also applicable to the case where the frequency relationship among the frequency bands is reversed, by appropriately changing the processing according to the frequency relationship.

Thus, in this second embodiment, allocation rates for channels to be used for communications between a second radio base station and a mobile terminal device are obtained according to a number of mobile terminal devices that are carrying out communications with the second radio base station and a total received power (interference power) of signals other than those from the mobile terminal device, while controlling a received power of signals from the mobile terminal device as received by the second radio base station to be constant, a channel switching distance to be a criterion for switching communication channels is obtained according to the obtained allocation rates, a distance between the second radio base station and the mobile terminal device is obtained, and a communication channel of a frequency far from a first frequency band is allocated to communications between the second radio base station and the mobile terminal device when the obtained distance is greater than the channel switching distance.

As described above, the received power of the signals from the mobile terminal device as received by the second radio base station is controlled to be constant, so that when the distance between the second radio base station and the mobile terminal device is greater than the channel switching distance, the transmission power of the mobile terminal device is high and it can be expected that the interference power to be given to the first radio base station is large.

For this reason, by carrying out the channel allocation according to the distance between the second radio base station and the mobile terminal device as described above, it is possible to reduce interferences to be caused to the first radio base station easily. In particular, when a covered area (cell) of the first radio base station is small compared with the cell of the second radio base station, and many first radio base stations are contained in the cell of the second radio base station, the interferences to be caused to the first radio base station will depend on the transmission power of the mobile terminal device, so that by carrying out the channel allocation as described above, it is possible to reduce interferences easily.

Also, by carrying out such a communication channel allocation, it is possible to relax the characteristic required to the filter of the mobile terminal device. Consequently, it is possible to contribute to the reduction of the size and the power consumption of the mobile terminal device.

In addition, it is possible to realize the communication channel allocation that accounts for the actual utilization state of radio signals, so that it is possible to contribute to the improvement of the spatial utilization efficiency of radio signals.

It is also to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A communication channel allocation method for allocating a communication channel to communications between a mobile terminal device and a second radio base station using a second frequency band which is close to a first frequency band used by a first radio base station, the communication channel allocation method comprising the steps of:

controlling a received power of signal form the one mobile terminal device at the second radio base station to be constant;

obtaining allocation rates for channels to be used for communications between the second radio base station and the one mobile terminal device according to a total number of mobile terminal devices that are carrying out communications with the second radio base station and a total received power of signals other than signals from the one mobile terminal device;

obtaining a channel switching distance to be a criterion for switching communication channels, according to the allocation rates;

detecting a distance between the second radio base station and the one mobile terminal device; and allocating a communication channel of a frequency far from the first frequency band in the second frequency band to the communications between the second radio base station and the mobile terminal device when the distance is greater than the channel switching distance.

2. The communication channel allocation method of claim 1, wherein the allocating step allocates a communication channel among a group of channels of frequencies far from the first frequency band in the second frequency band.

3. The communication channel allocation method of claim 1, wherein the allocating step allocates a communication channel of a frequency close to the first frequency band in the second frequency band to the communications between the second radio base station and the mobile terminal device when the distance is less than or equal to the channel switching distance.

4. The communication channel allocation method of claim 3, wherein the allocating step allocates available communication channel among a group of channels of frequencies close to the first frequency band in the second frequency band.

5. A communication control device for controlling a communication channel to be used for communications between one mobile terminal device and a second radio base station using a second frequency band which is close to a first frequency band used by a first radio base station, the communication control device comprising:

a received power control unit configured to control a received power of signals from the one mobile terminal device at the second radio base station to be constant;

an allocation rate calculation unit configured to obtain allocation rates for channels to be used for communications between the second radio base station and the one mobile terminal device according to a total number of mobile terminal devices that are carrying out communications with the second radio base station and a total received power of signals other than signals from the one mobile terminal device;

a distance calculation unit configured to obtain a channel switching distance to be a criterion for switching communication channels, according to the allocation rates;

a distance detection unit configured to detect a distance between the second radio base station and the one mobile terminal device; and a channel allocation unit configured to allocate a communication channel of a frequency far from the first frequency band in the second frequency band to the communications between the second radio base station and the mobile terminal device when the distance is greater than the channel switching distance.

6. The communication control device of claim 5, wherein the channel allocation unit is configured to allocate available communication channel among a group of channels of frequencies far from the first frequency band in the second frequency band.

7. The communication control device of claim 5, wherein the channel allocation unit is also configured to allocate a communication channel of a frequency close to the first frequency band in the second frequency band to the communications between the second radio base station and the mobile terminal device when the distance is less than or equal to the channel switching distance.

8. The communication control device of claim 7, wherein the channel allocation unit is configured to allocate available communication channel among a group of channels of frequencies close to the first frequency band in the second frequency band.

* * * * *